(12) United States Patent
Abarham et al.

(10) Patent No.: US 12,314,641 B1
(45) Date of Patent: May 27, 2025

(54) SYSTEMS AND METHODS FOR HIGH-SPEED COMPUTATIONALLY EFFICIENT OPERATION AND TRAINING OF MACHINE LEARNING-BASED SIMULATION MODELS CHARACTERIZING A PHYSICAL SYSTEM

(71) Applicant: Ansys, Inc., Canonsburg, PA (US)

(72) Inventors: Mehdi Abarham, Belmont, CA (US); Saeed Asgari, Westborough, MA (US); Viral Gandhi, Nashua, NH (US)

(73) Assignee: Ansys, Inc., Canonsburg, PA (US)

( * ) Notice: Subject to any disclaimer, the term of this patent is extended or adjusted under 35 U.S.C. 154(b) by 959 days.

(21) Appl. No.: 17/392,350

(22) Filed: Aug. 3, 2021

(51) Int. Cl.
*G06F 30/27* (2020.01)

(52) U.S. Cl.
CPC .................. *G06F 30/27* (2020.01)

(58) Field of Classification Search
CPC ................ G06F 30/20; G06F 30/27
See application file for complete search history.

(56) References Cited

U.S. PATENT DOCUMENTS

| | | | |
|---|---|---|---|
| 10,558,770 B1 * | 2/2020 | Kanthasamy | G06T 17/20 |
| 2009/0306943 A1 * | 12/2009 | Abdel-Khalik | G06F 30/20 703/2 |
| 2016/0306679 A1 * | 10/2016 | Mendoza | G01V 99/00 |
| 2020/0202052 A1 * | 6/2020 | Cunha | G06F 30/17 |

OTHER PUBLICATIONS

Asgari, Saeed, Hu, Xiao, Tsuk, Michael, Kaushik, Shailendra; Application of POD Plus LTI ROM to Battery Thermal Modeling: SISO Case; SAE International Journal of Commercial Vehicles, 7(1); pp. 278-285; May 2014.

Hu, Xiao, Asgari, Saeed, Yavuz, Ibrahim, Stanton, Scott, Hsu, Chih-Cheng, Shi, Zhongying, Wang, Bao, Chu, Hao-Kun; A Transient Reduced Order Model for Battery Thermal Management Based on Singular Value Decomposition; IEEE Energy Conversion Congress and Exposition; Pittsburgh, PA; pp. 3971-3976; Sep. 2014.

\* cited by examiner

*Primary Examiner* — Kibrom K Gebresilassie
(74) *Attorney, Agent, or Firm* — Jones Day

(57) ABSTRACT

Systems and methods are provided for a computer-implemented method for simulating operation of a physical system represented by a plurality of mesh cells. A plurality of pre-simulations of the physical system are performed, where a pre-simulation determines an output metric value for each mesh cell based on a plurality of input metric values. A dimension reduction is performed on results of the pre-simulations to generate condensed training data, and a simulation model is generated using a machine learning algorithm to train a plurality of sub-models for simulating output metric values for the plurality of mesh cells based on the condensed training data. The simulation model is configured to provide simulation inputs to the trained sub-models to generate an output metric value for each of the plurality of mesh cells.

20 Claims, 28 Drawing Sheets

FIG. 3

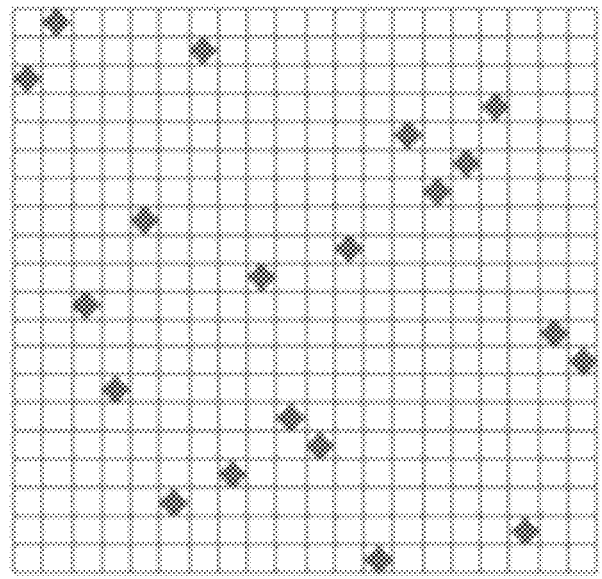
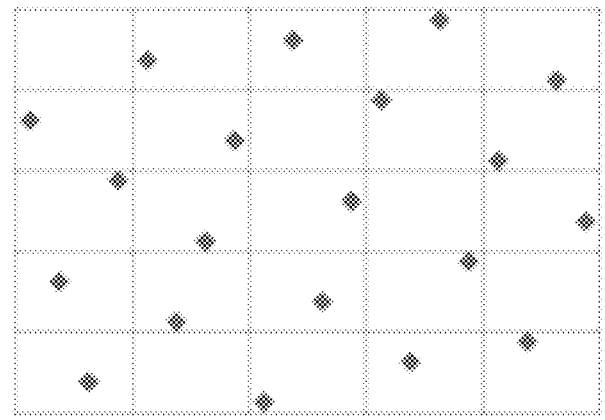
FIG. 6

| | Case 1 | Case 2 | Case 3 | Case 4 | Case 5 | Case 6 | Case 7 | Case 8 | Case 9 |
|---|---|---|---|---|---|---|---|---|---|
| Physics | | Conduction | | | Natural Convection | Forced Convection | Joule Heating | | Thermo-Mechanical |
| Number of Parameters | 25 | 25 | 100 | 576 | 18 | 4 | 2 | 10 | 18 |
| Number of Snapshots | 26 | 200 | 101 | 577 | 50 | 25 | 40 | 66 | 19 |
| Parameter/Snapshot Ratio | 1X | 8X | 1X | 1X | 3X | 4X | 20X | 6.6X | 1X |
| Speed | | | | | | | | | |
| SVDML Training (sec) | 0.2 | 1.3 | 1.5 | 100 | 0.4 | 1.6 | 2.2 | 7.7 | 1.2 |
| Conventional Training (sec) | 8 | 540 | 1500 | >65000 | 20 | 5 | 6 | 80 | 8 |
| Speedup with SVDML | 39X | 415X | 1000X | >650X | 53X | 3X | 3X | 10X | 7X |

FIG. 9

2502: INVOKING A SIMULATION MODEL THAT ACCEPTS M SIMULATION INPUTS TO GENERATE AN OUTPUT METRIC VALUE FOR EACH OF N PLURALITY OF MESH CELLS, THE SIMULATION MODEL COMPRISING X TRAINED SUB-MODELS, WHERE X IS LESS THAN N BY:

INVOKING EACH OF THE X SUB-MODELS WITH THE M INPUT METRIC VALUES TO GENERATE A [1-BY-] MATRIX
2504

MULTIPLYING THE [1-BY-X] MATRIX BY AN [X-BY-N] MATRIX TO GENERATE THE OUTPUT METRIC VALUE FOR EACH OF THE N MESH CELLS
2506

FIG. 25

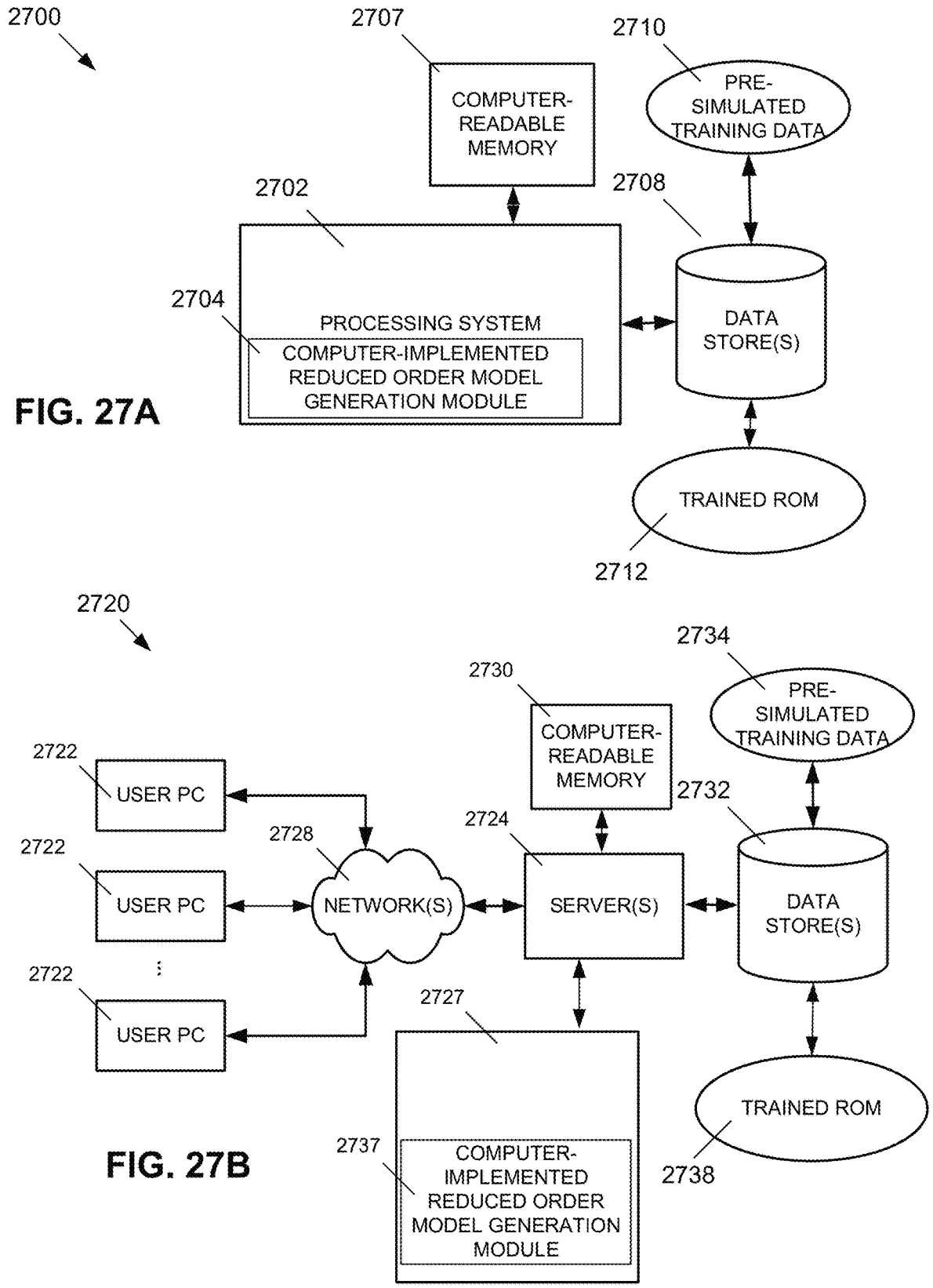

SYSTEMS AND METHODS FOR HIGH-SPEED COMPUTATIONALLY EFFICIENT OPERATION AND TRAINING OF MACHINE LEARNING-BASED SIMULATION MODELS CHARACTERIZING A PHYSICAL SYSTEM

BACKGROUND

Engineering simulation enables analysis and prediction of behaviors of physical systems without the need to physically build or test the physical system. During a design phase, simulation can enable engineers to test a variety of system designs under a wide range of operating conditions without the time and cost of building those system designs or physical models thereof. With regard to existing physical systems, simulation enables analysis of that system under various conditions (e.g., typical operating conditions over a long period of time, extreme operating conditions) to identify possible sub-optimal behaviors of the physical system before they occur. But full simulation (e.g., full computational fluid dynamics (DFD) simulation) of complex systems can be extremely time consuming, thereby limiting the usefulness of the simulation.

SUMMARY

Systems and methods are provided for a computer-implemented method for simulating operation of a physical system represented by a plurality of mesh cells. A plurality of pre-simulations of the physical system are performed, where a pre-simulation determines an output metric value for each mesh cell based on a plurality of input metric values. A dimension reduction is performed on results of the pre-simulations to generate condensed training data, and a simulation model is generated using a machine learning algorithm to train a plurality of sub-models for simulating output metric values for the plurality of mesh cells based on the condensed training data. The simulation model is configured to provide simulation inputs to the trained sub-models to generate an output metric value for each of the plurality of mesh cells.

As another example, a method of simulating operation of a physical system represented by a plurality of mesh cells includes invoking a simulation model that accepts M input metric values and provides an output metric value for each of N mesh cells, where the simulation model includes a plurality of X trained sub-models, where X is less than N, to generate an output metric value for each of the plurality of mesh cells by: invoking each of the X sub-models with the M input metric values to generate a [1-by-X] matrix and multiplying the [1-by-X] matrix by an [X-by-N] matrix to generate the output metric value for each of the N mesh cells.

As a further example, a method of training a model for simulation of a physical system includes performing a dimension reduction on results of pre-simulations of the physical system to generate condensed training data, where the pre-simulations determine an output metric value for each of N mesh cells based on M input metric values. A simulation model is generated using a machine learning algorithm to train no more than M+1 sub-models for simulating output metric values for the plurality of mesh cells based on the condensed training data, where the simulation model is configured to receive M simulation inputs, to provide the M simulation inputs to the no more than M+1 trained sub-models, and to generate an output metric value for each of the N of mesh cells.

Figure 3:
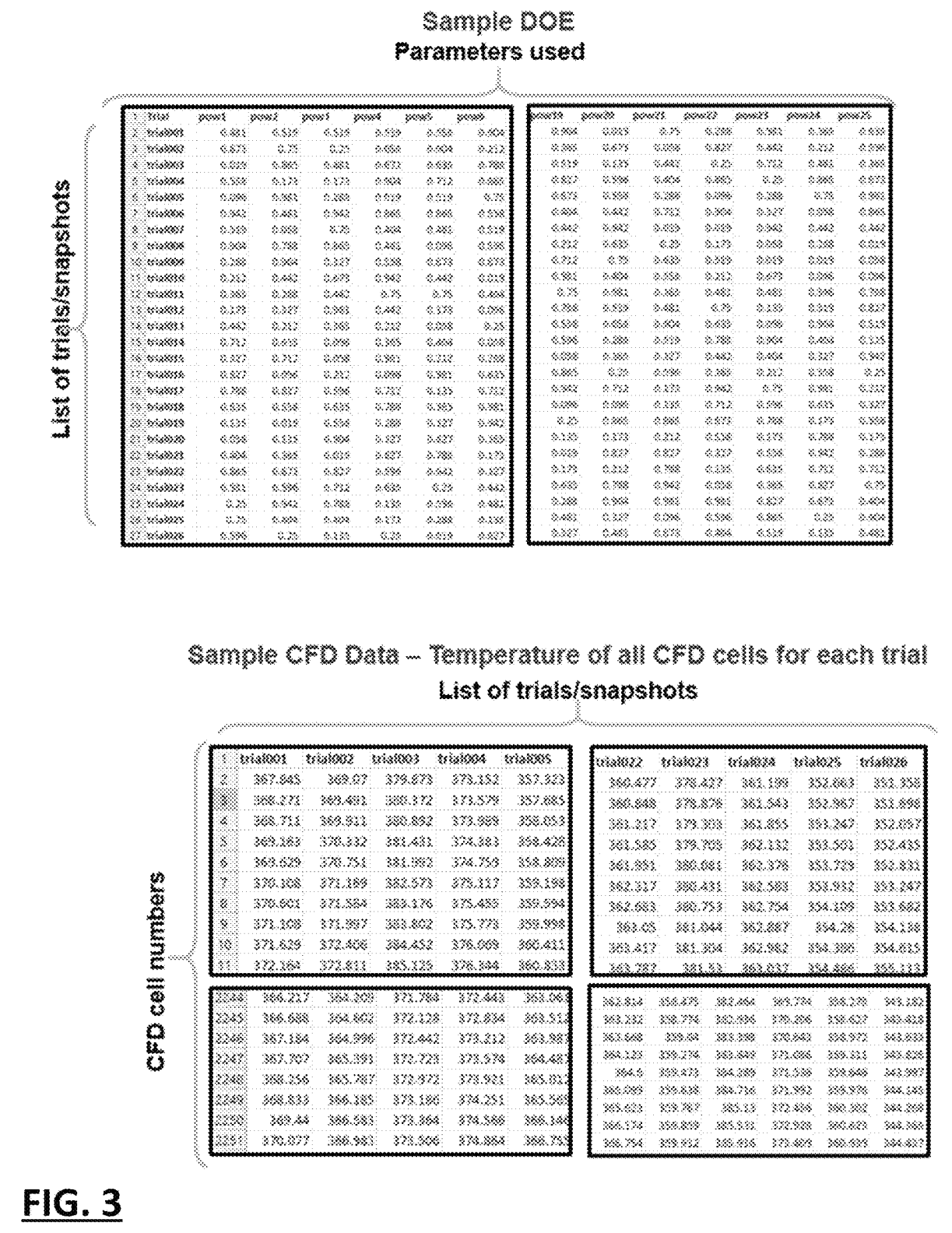

The top table of FIG. 3 is a depiction of example input metrics that are provided to a high-fidelity simulation model to produce per-cell output metrics that together form sets of training data, and the bottom table depicts the per-cell output metrics across training trials.

Figure 4:
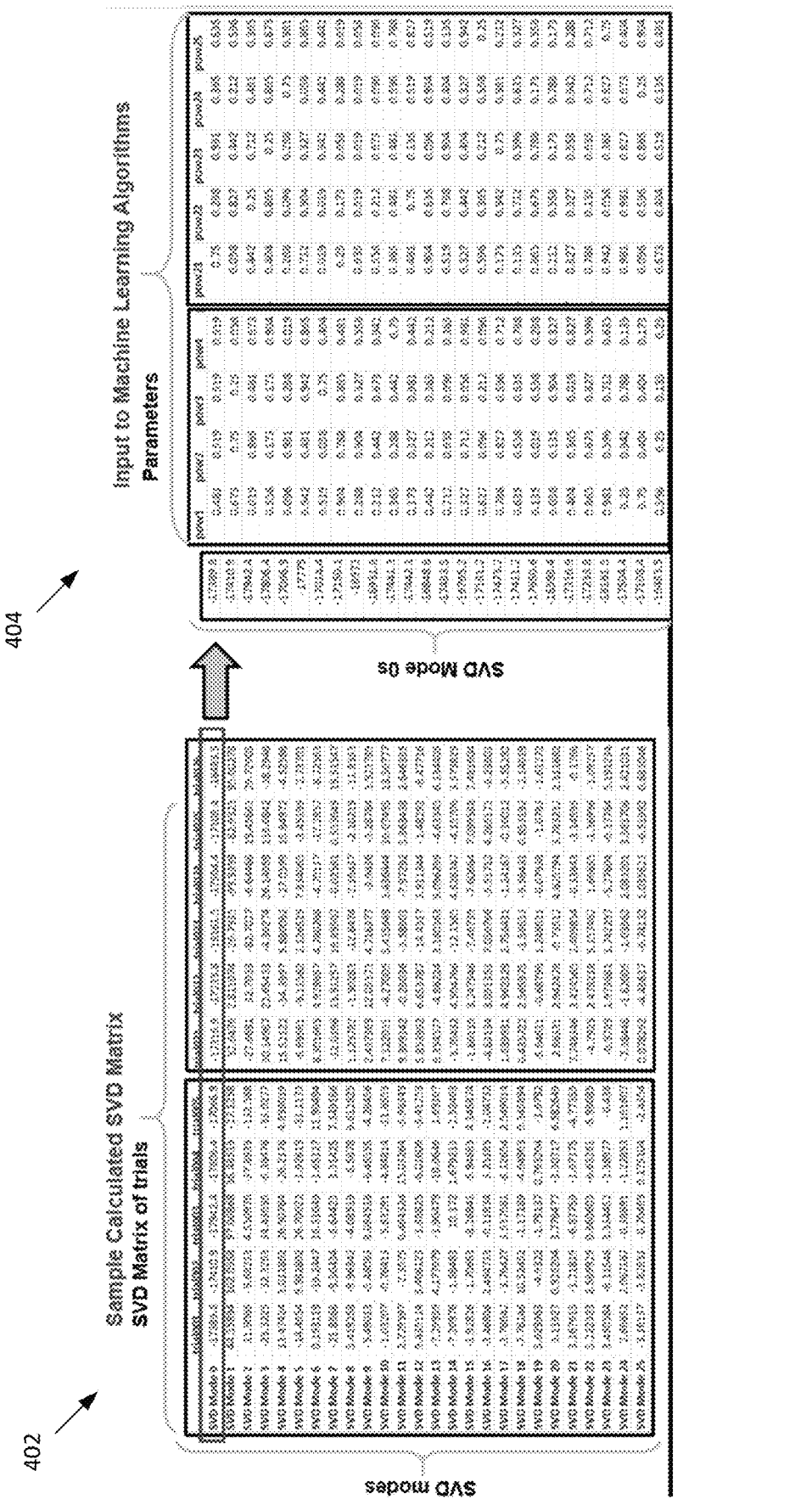

FIG. 4 is a diagram depicting condensed training data in the left hand table and data for training sub-models of a ROM in the right hand table.

Figure 5:
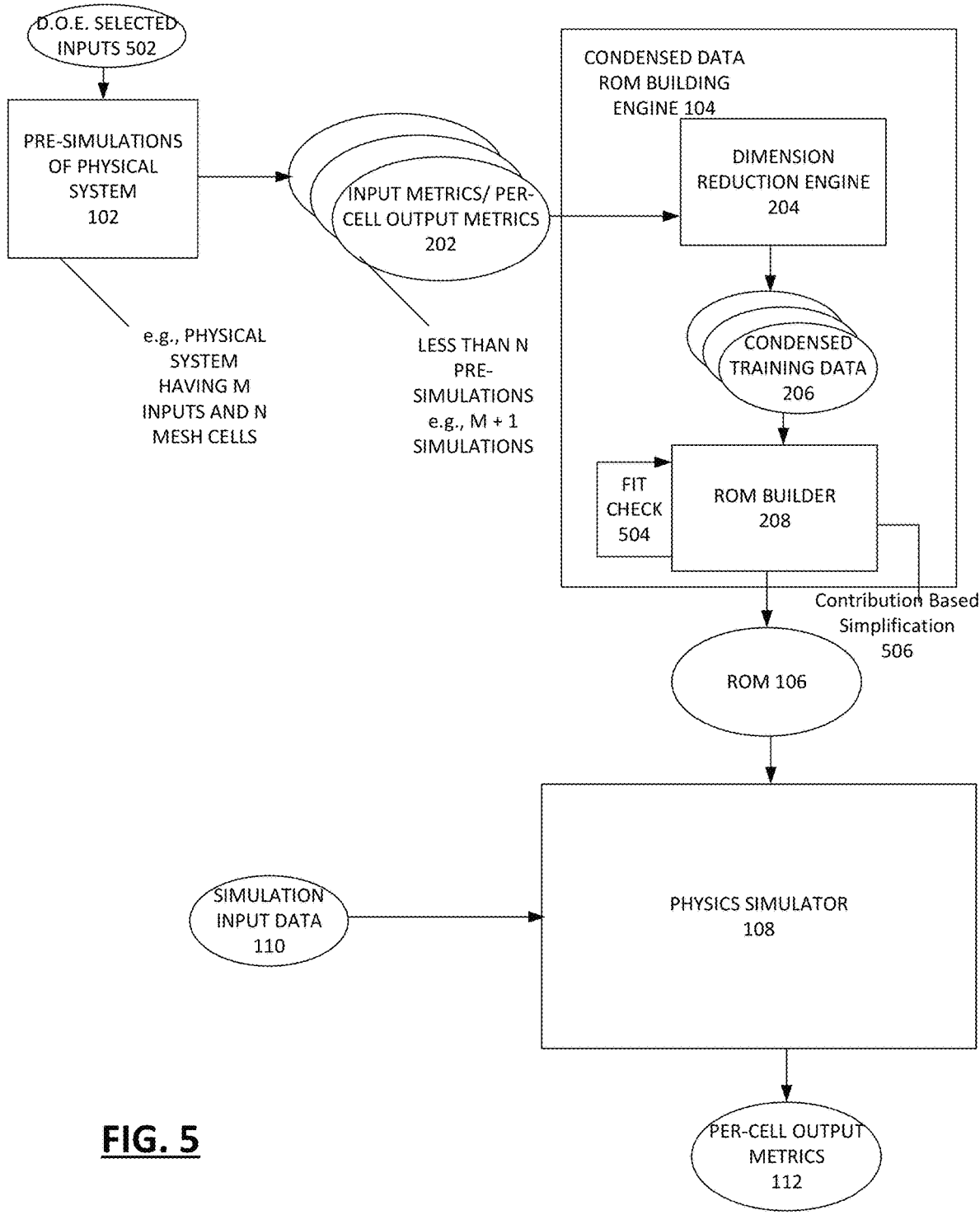

FIG. 5 is a flow diagram depicting the application of certain features to an example ROM generation process.

FIG. 6 illustrates example algorithms for Design of Experiments selection of pre-simulation inputs.

Figure 7:
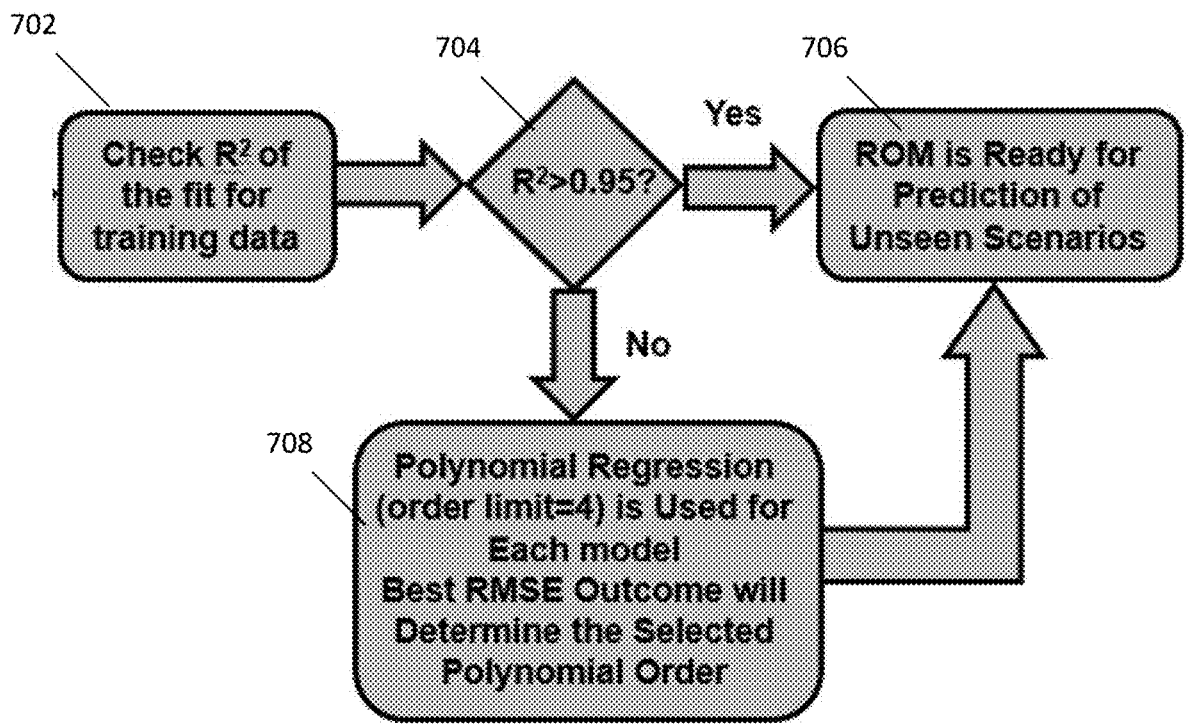

FIG. 7 is a flow diagram depicting an example fit check of sub-models of a ROM generated using a machine learning algorithm.

Figure 8:
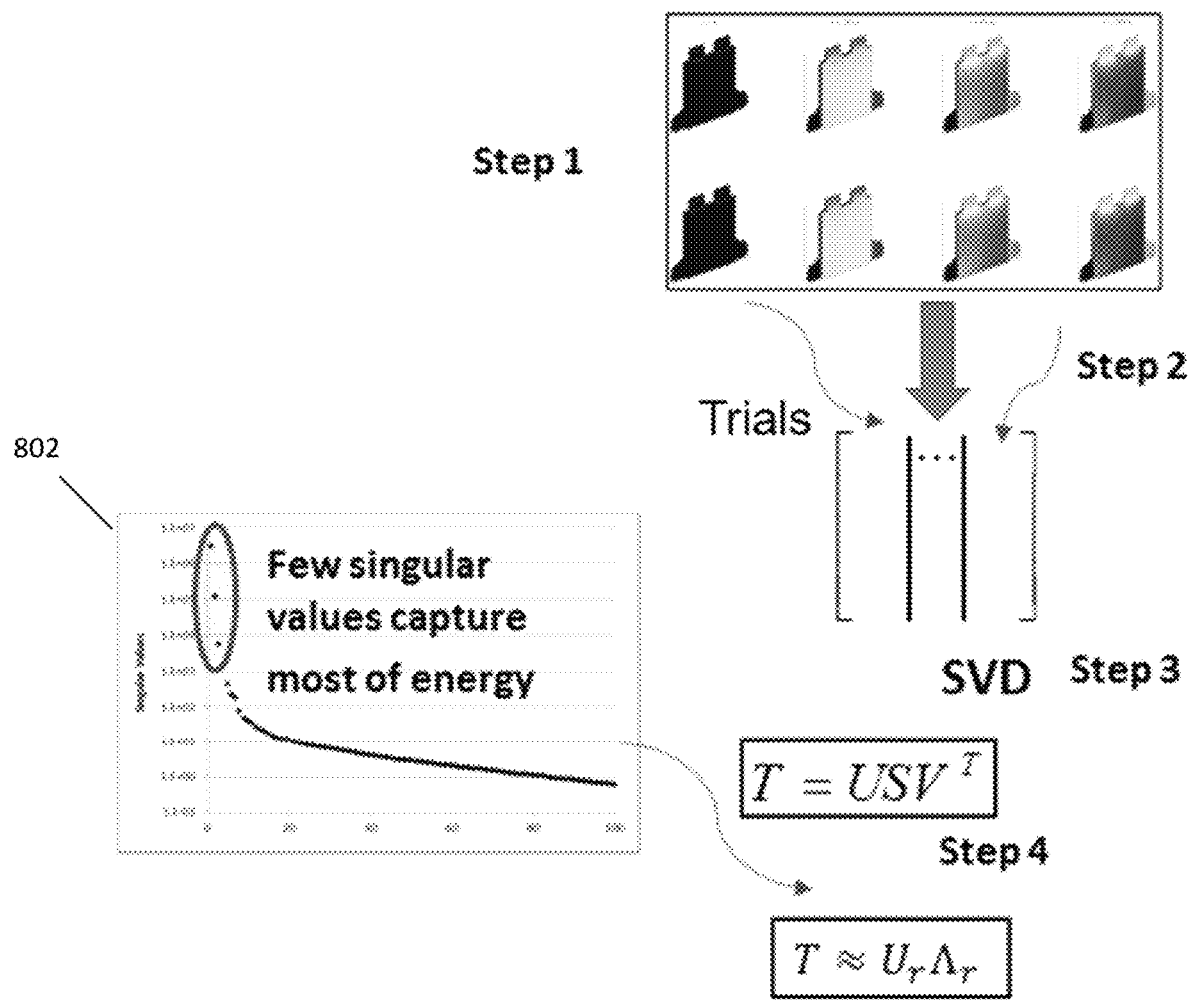

FIG. 8 is a diagram depicting contribution-based simplification of a ROM.

FIG. 9 is a table indicating training speed and accuracy of certain ROMs using condensed training data, such as described herein.

Figure 10:
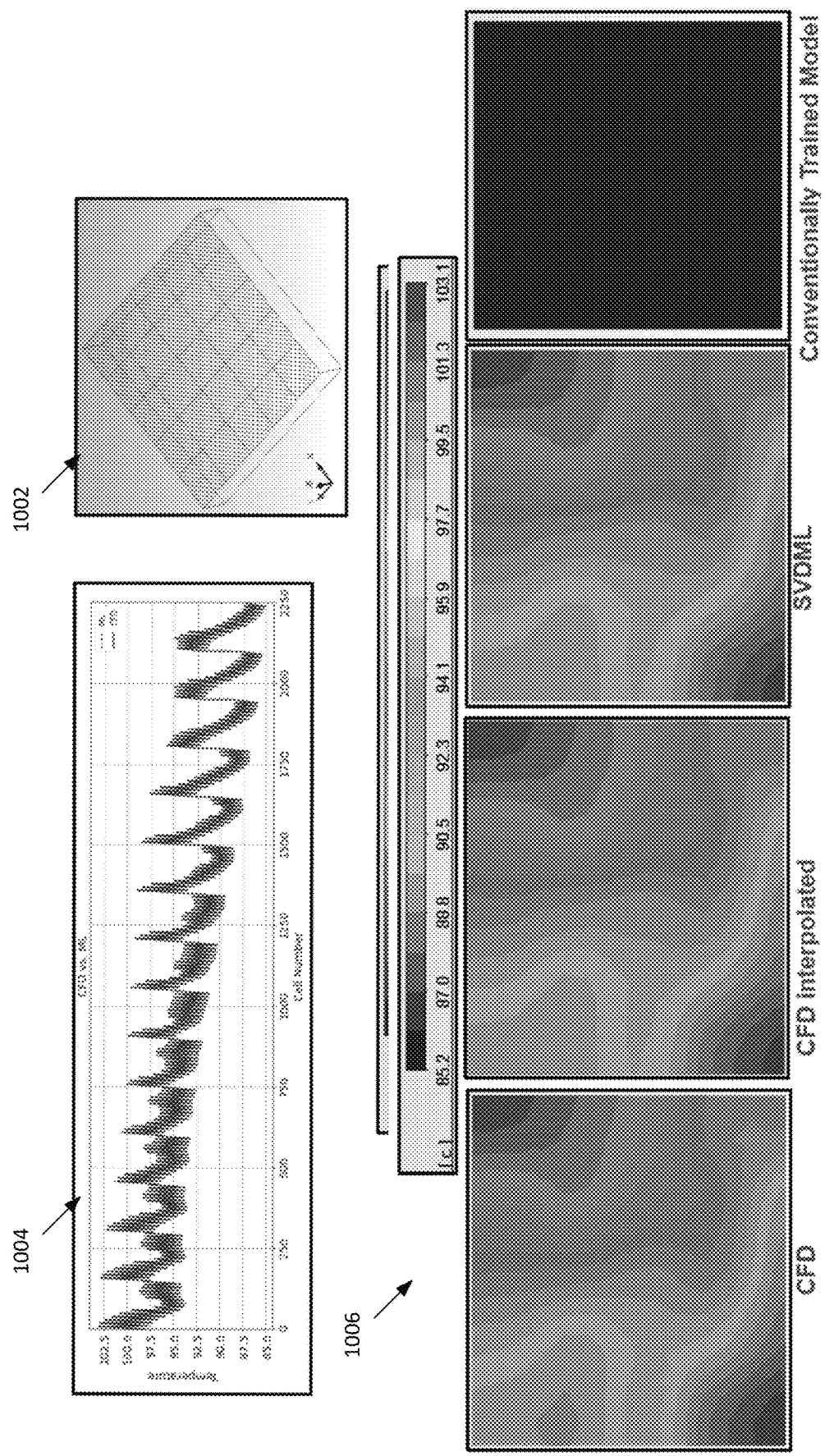

FIG. 10 depicts a conduction physics example (Case 1 of FIG. 9) having 25 heat sources between 0 and 1 W.

Figure 11:
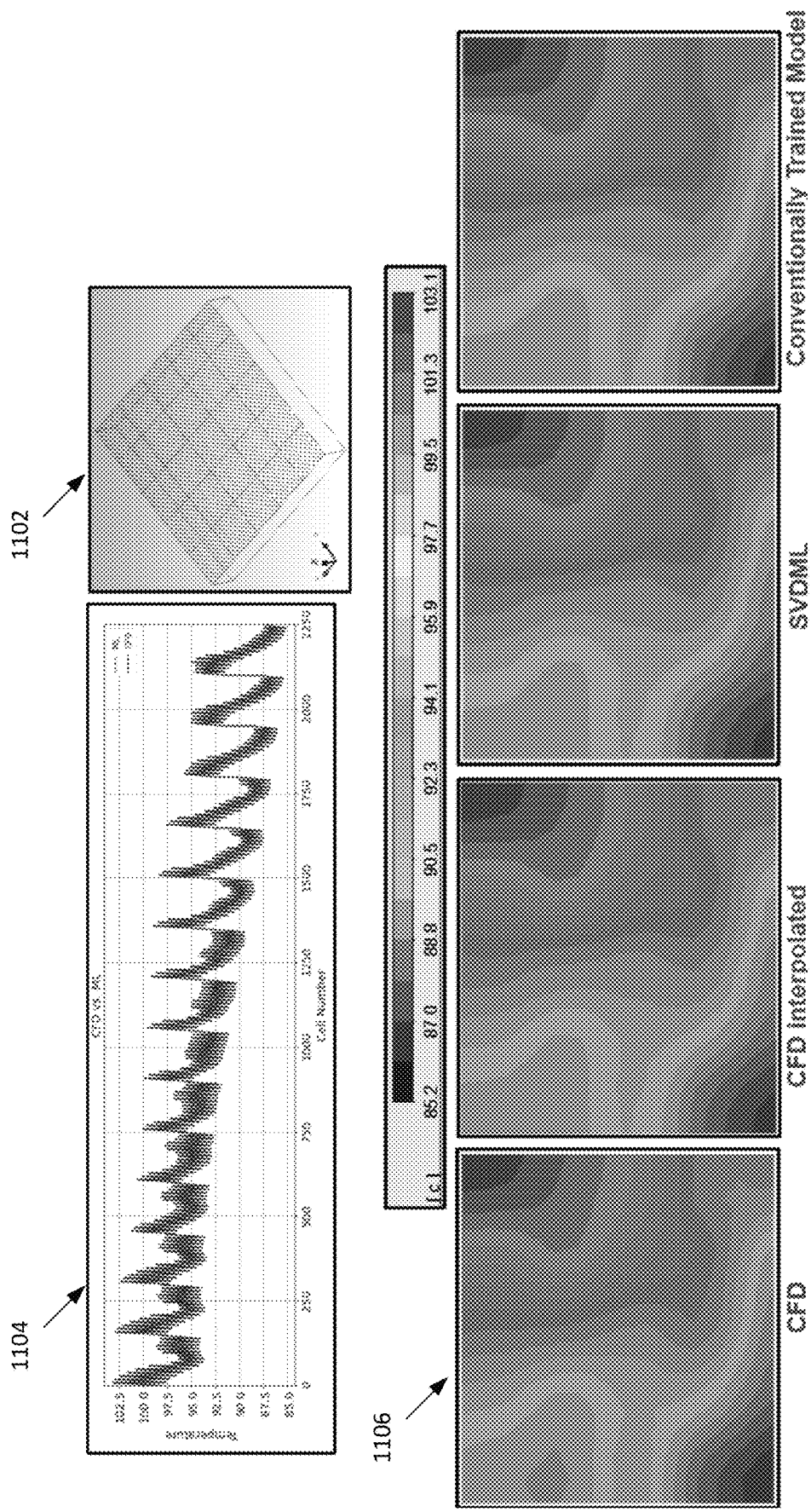

FIG. 11 depicts a conduction physics example (Case 2 of FIG. 9) having 25 heat sources between 0 and 1 W.

Figure 12:
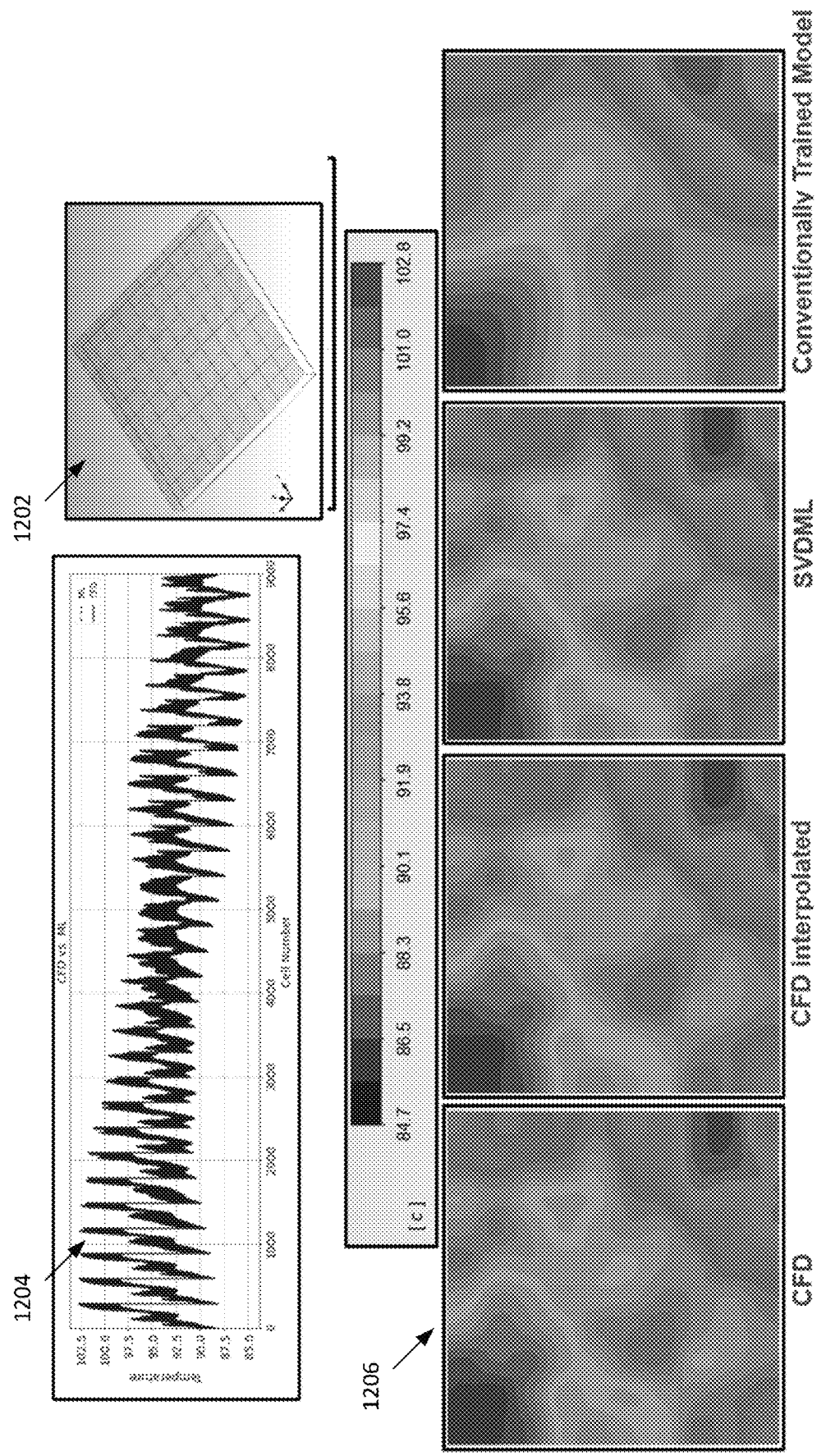

FIG. 12 depicts a conduction physics example (Case 3 of FIG. 9) having 100 heat sources between 0 and 1 W.

Figure 13:
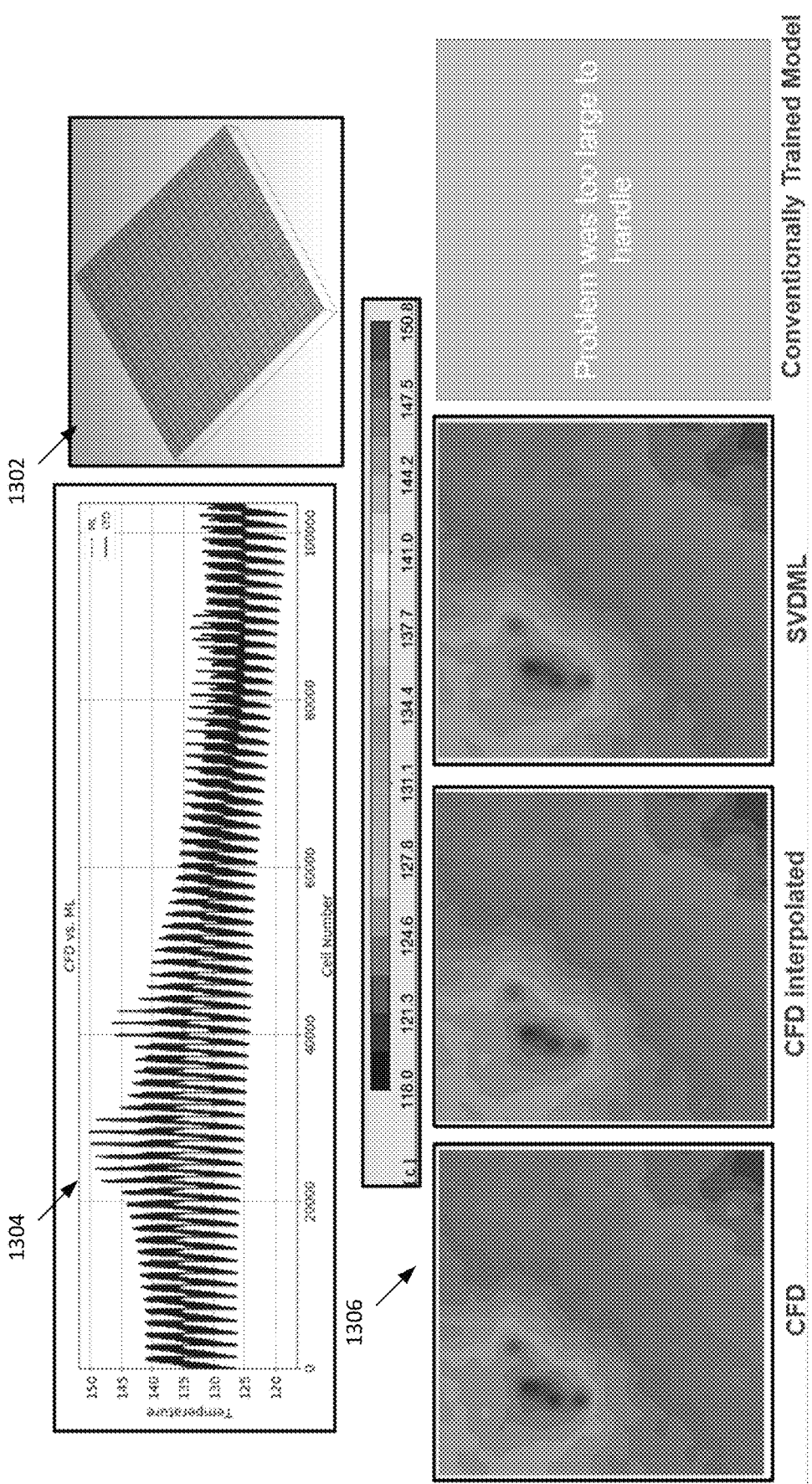

FIG. 13 depicts a conduction physics example (Case 4 of FIG. 9) having 576 heat sources between 0 and 1 W.

Figure 14:
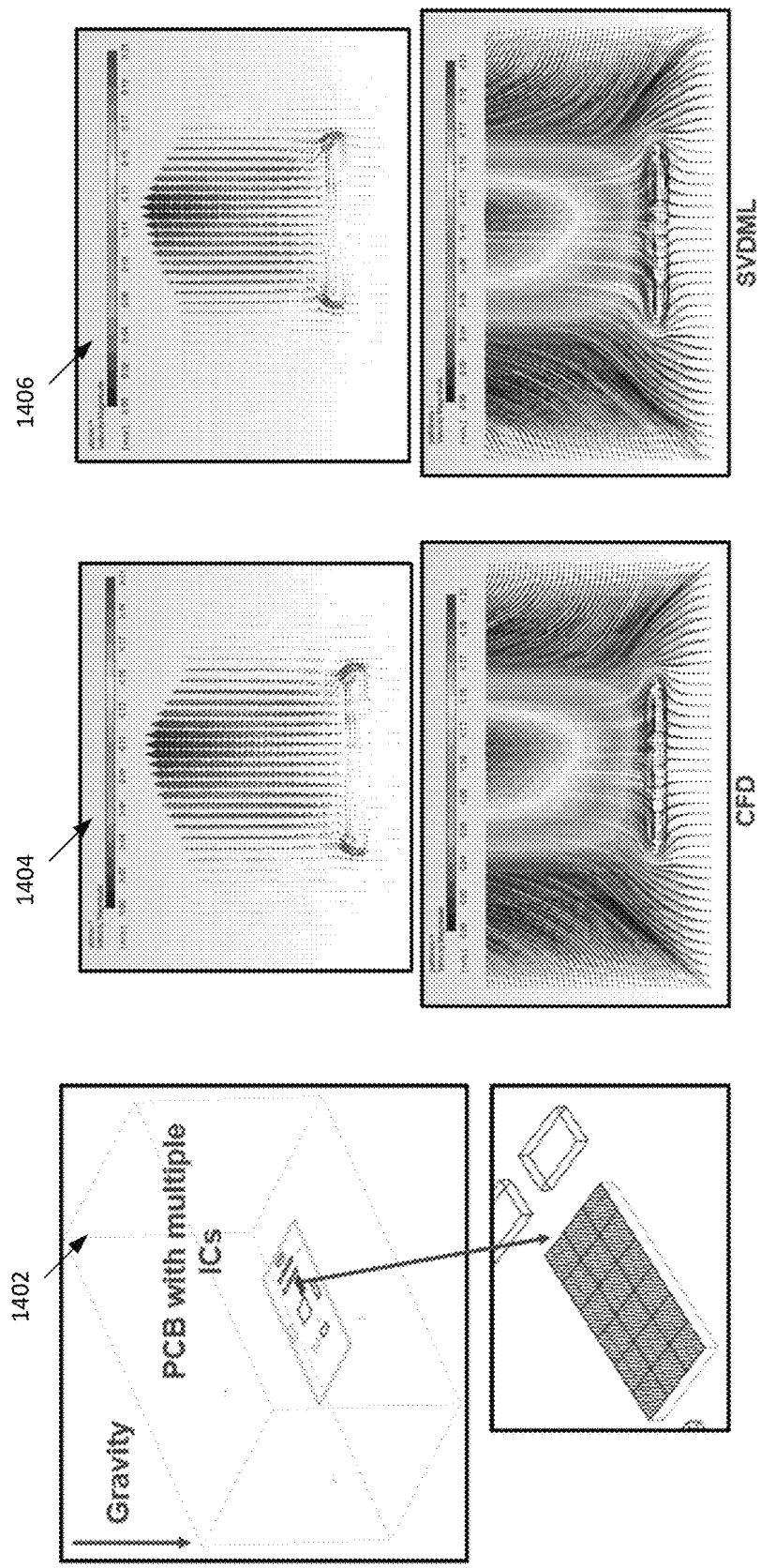
Figure 15:
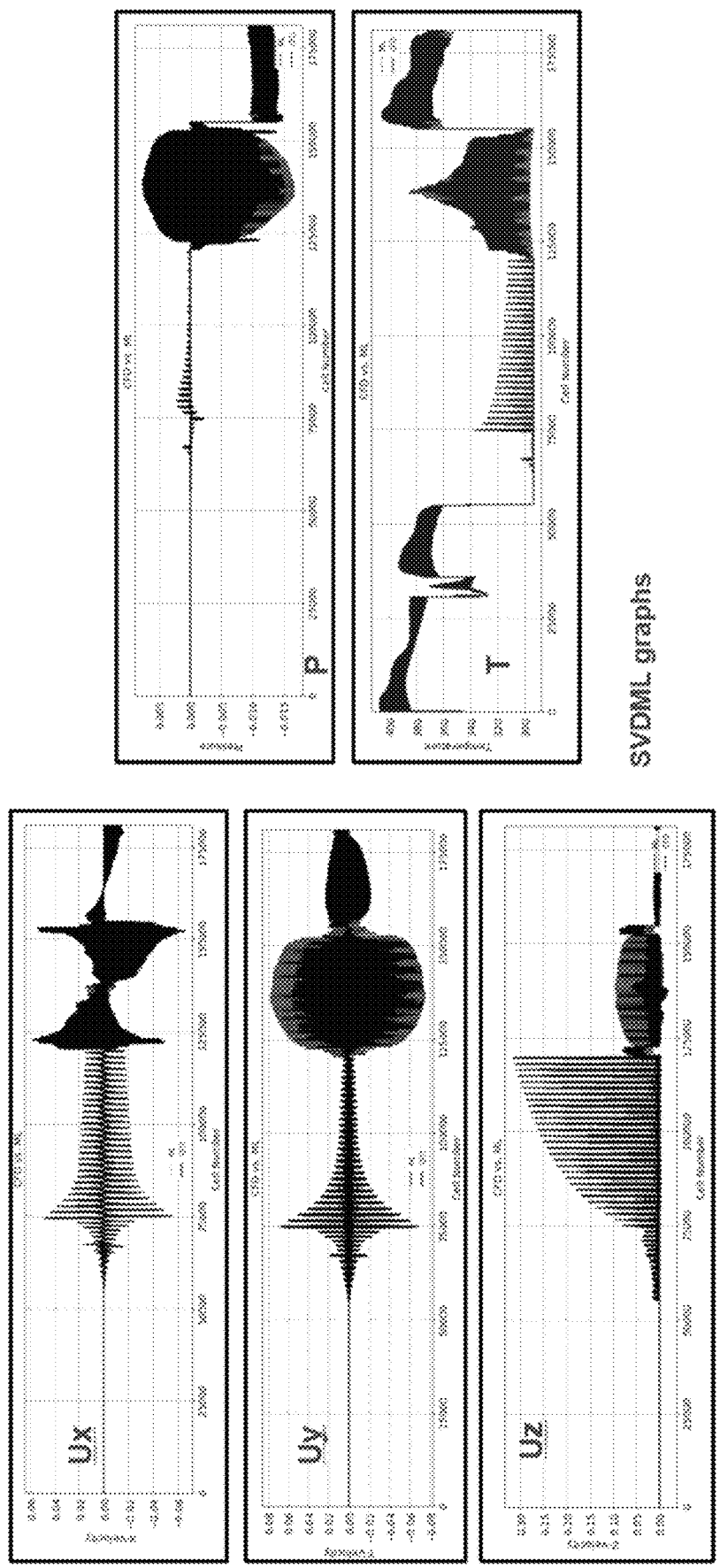
Figure 16:
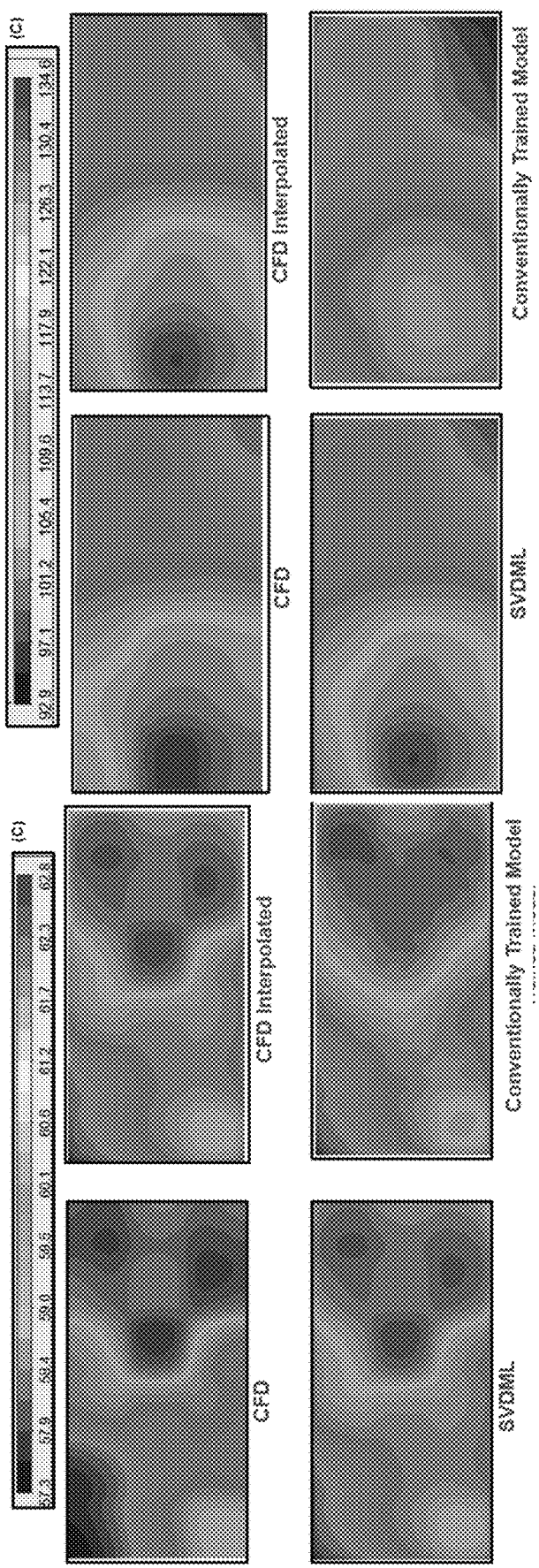

FIGS. 14-16 illustrate a conjugate heat transfer simulation utilizing natural convection.

Figure 17:
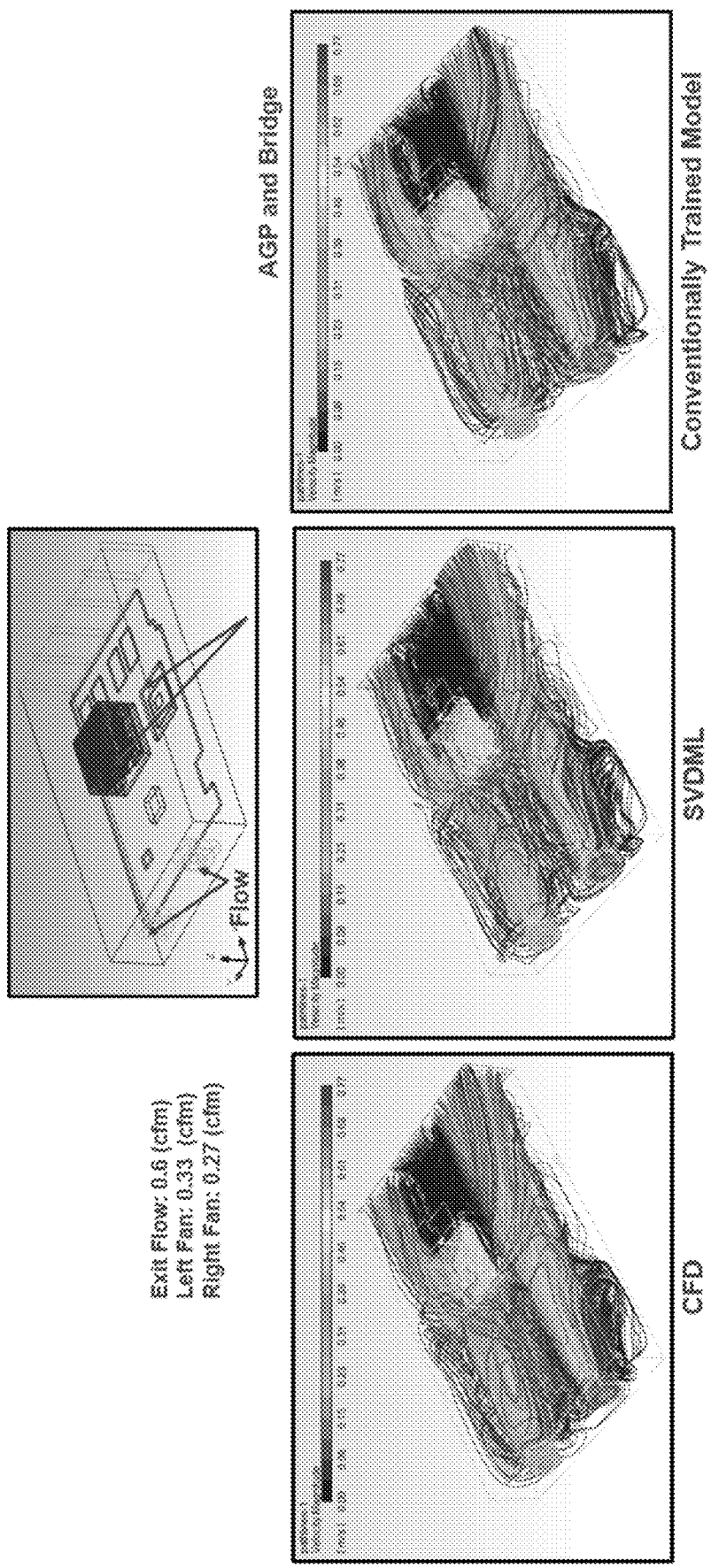
Figure 18:
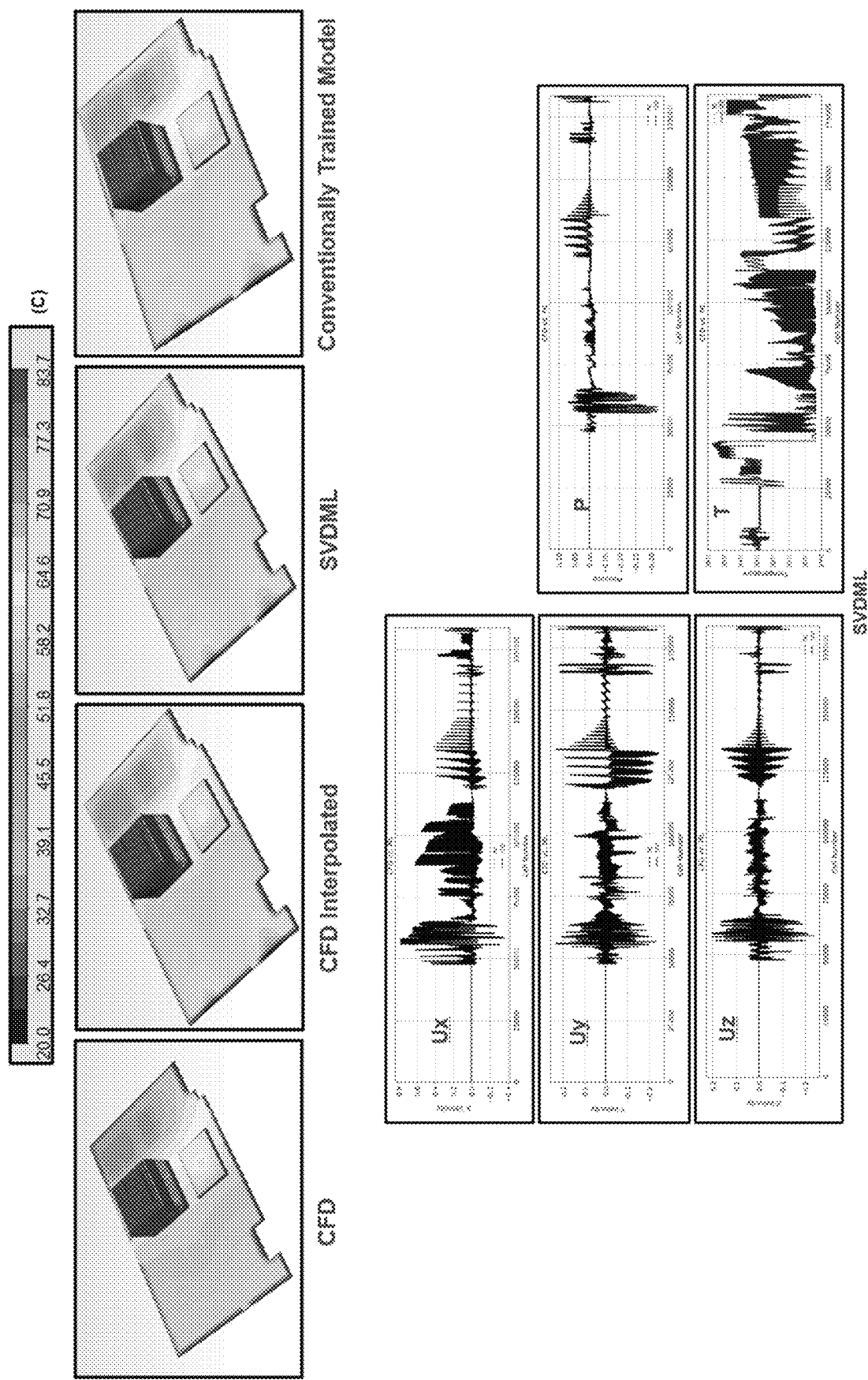

FIGS. 17-18 depict a conjugate heat transfer simulation using forced convection using two fans.

Figure 19:
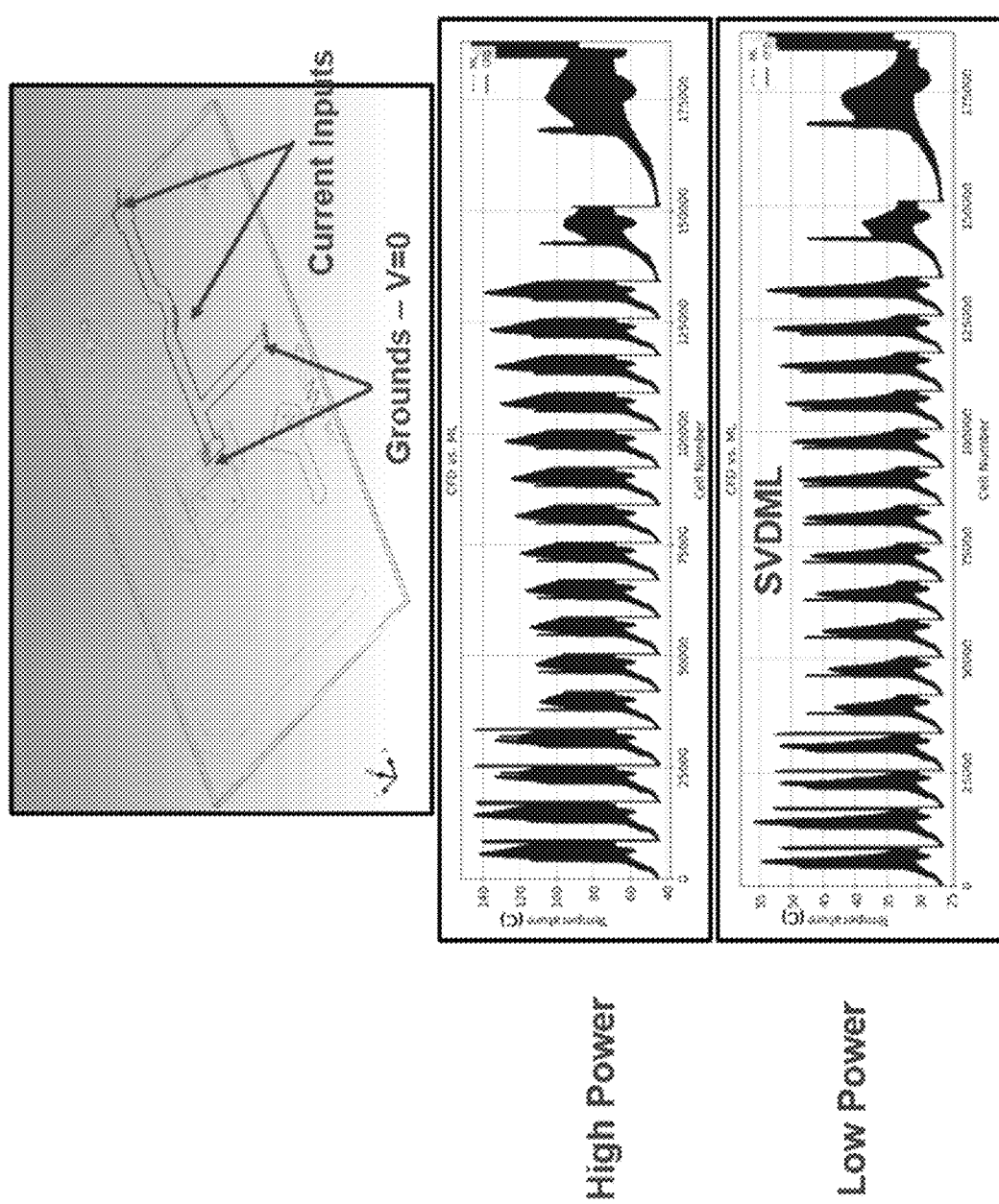
Figure 20:
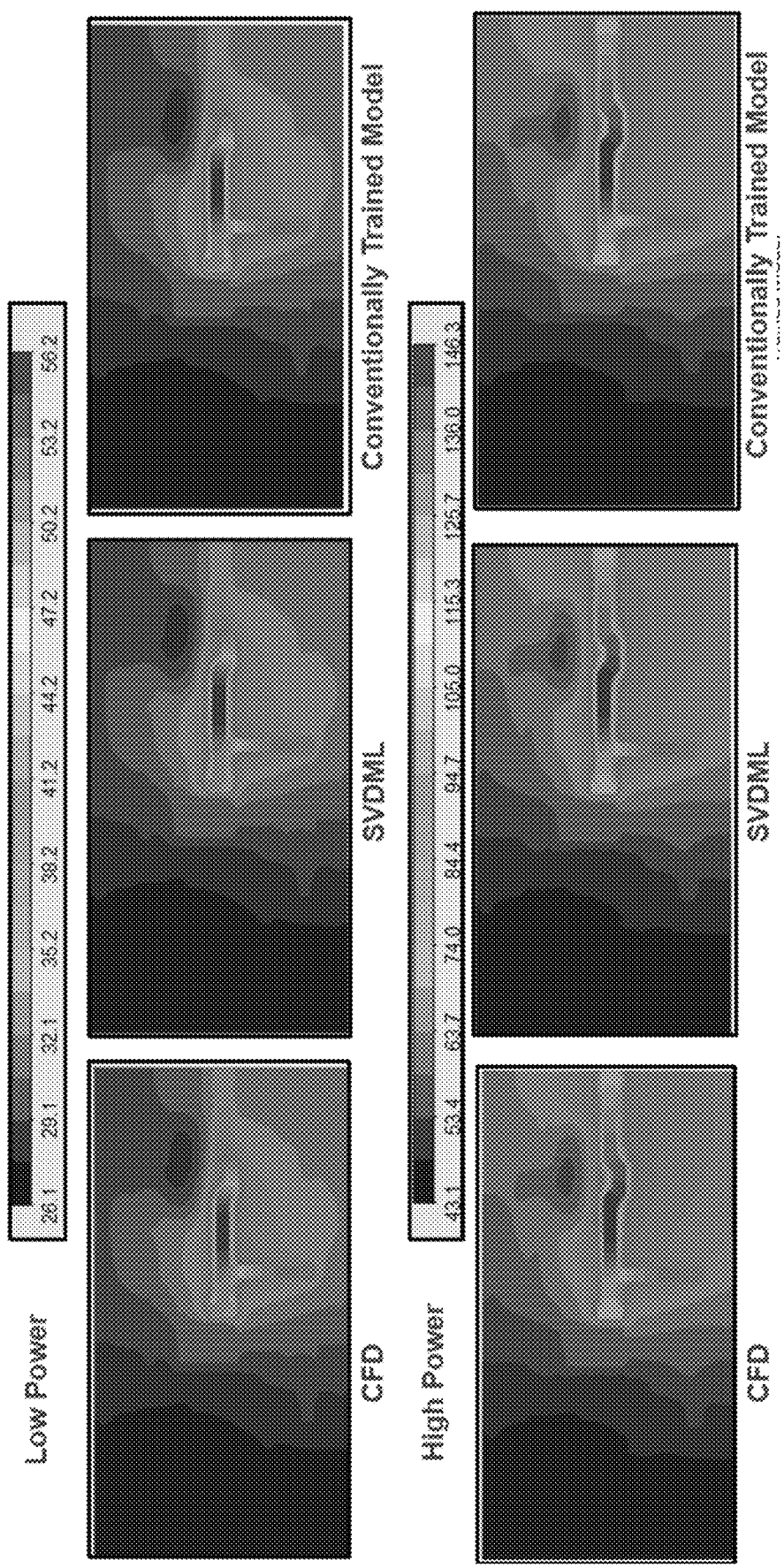

FIGS. 19-20 depicts a joule heating, conduction only simulation.

Figure 21:
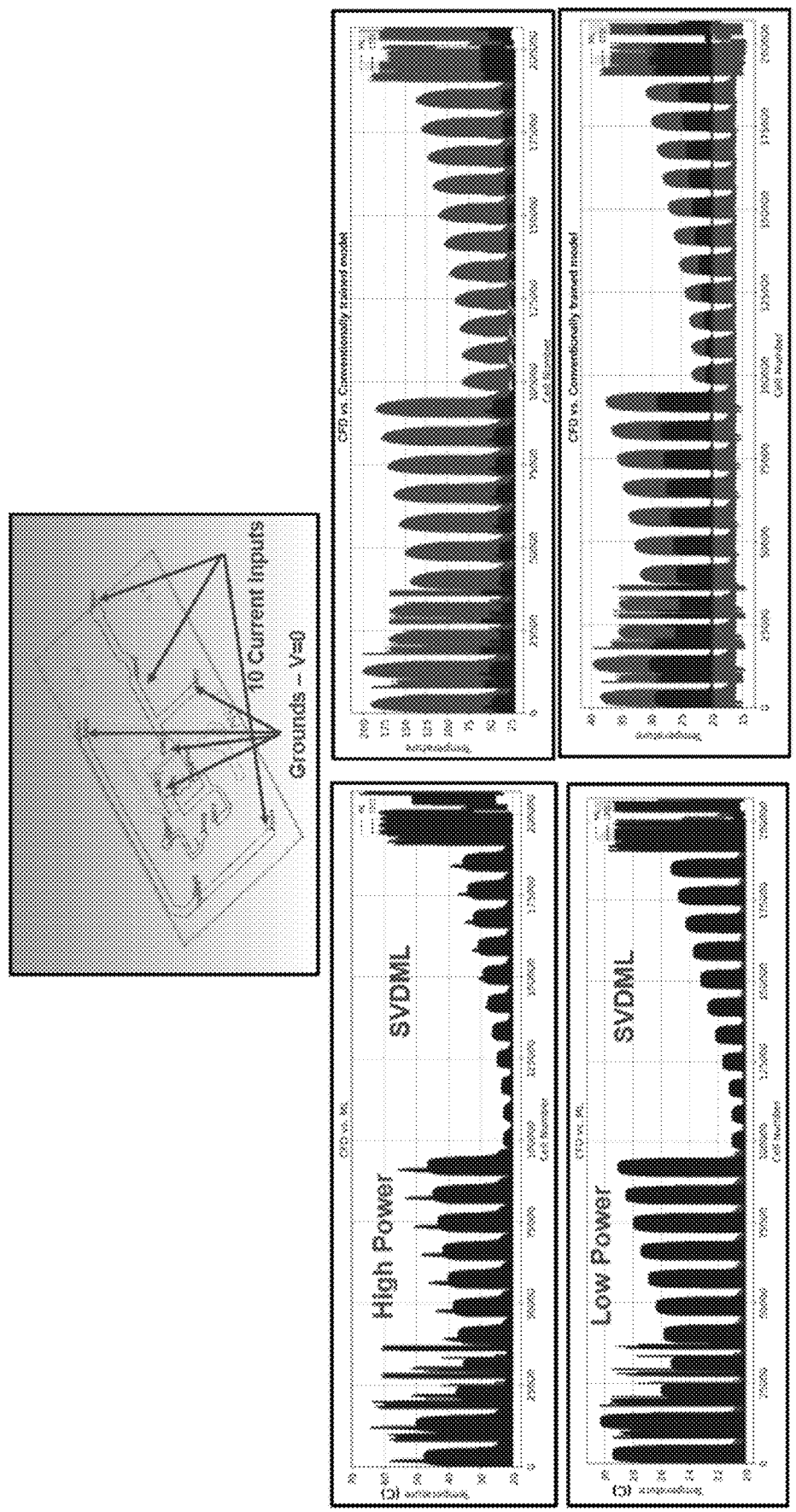
Figure 22:
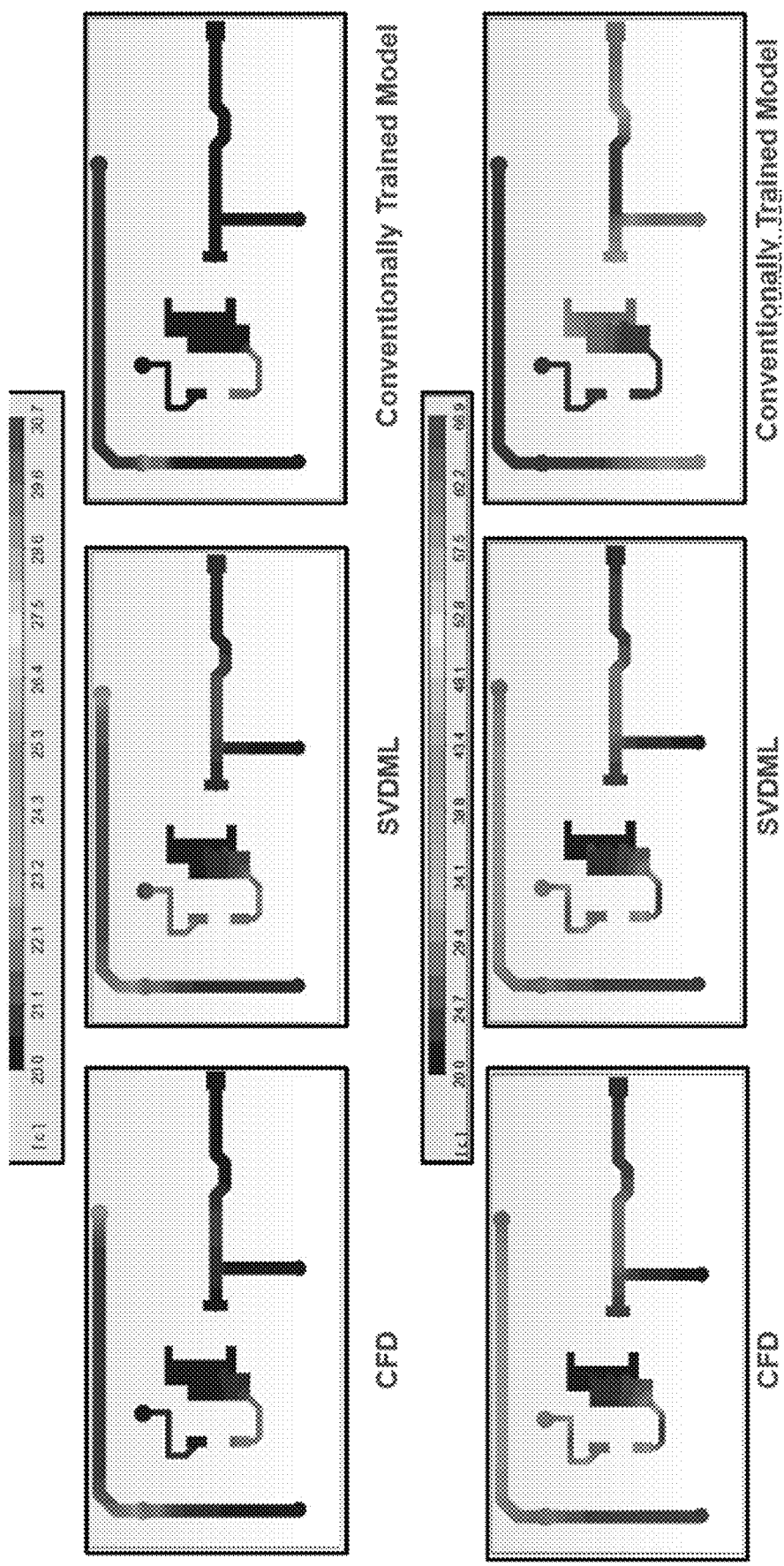

FIGS. 21-22 depict another joule heating, conduction only, simulation.

Figure 23:
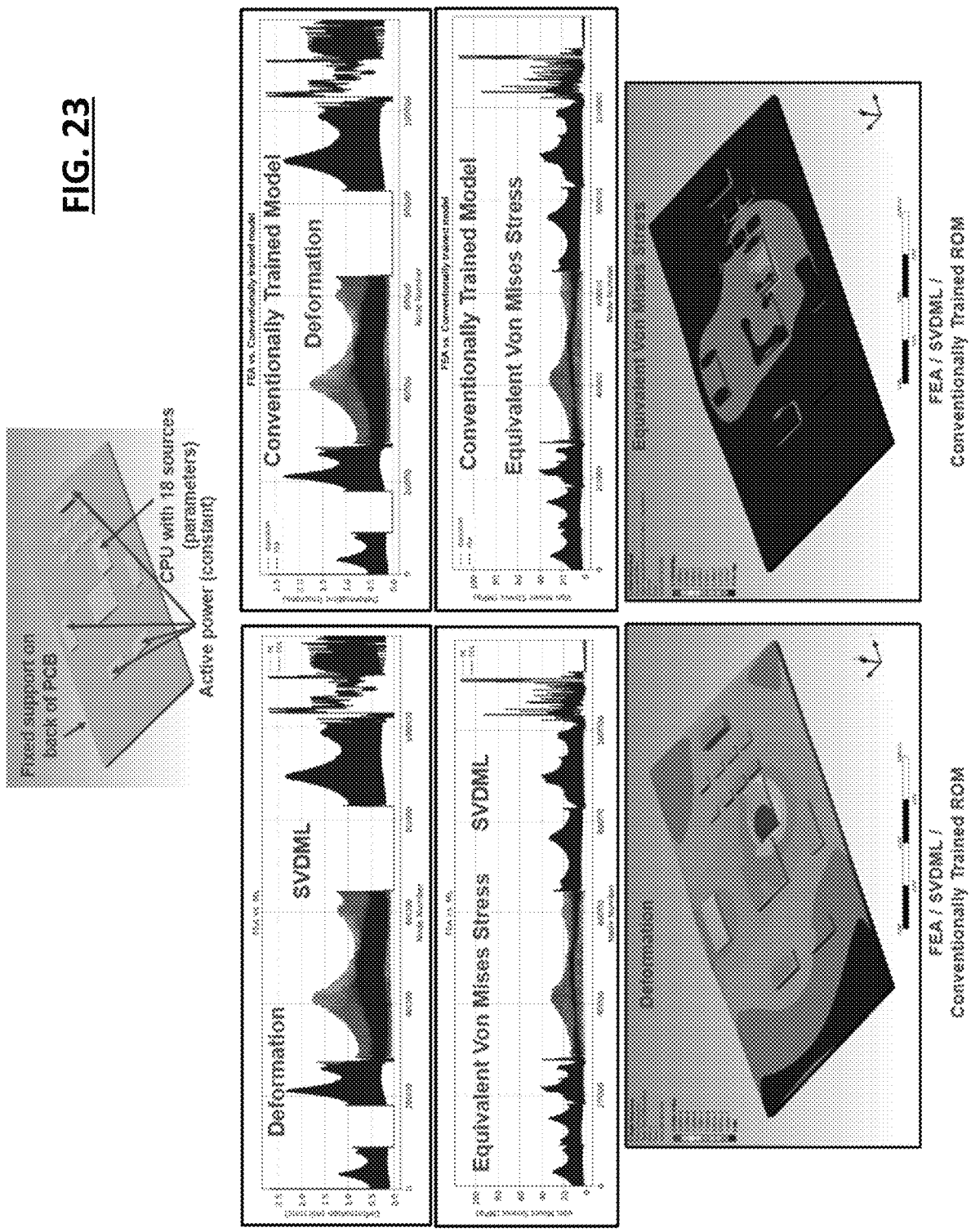

FIG. 23 depicts a thermos-mechanical finite element analysis.

Figure 24:
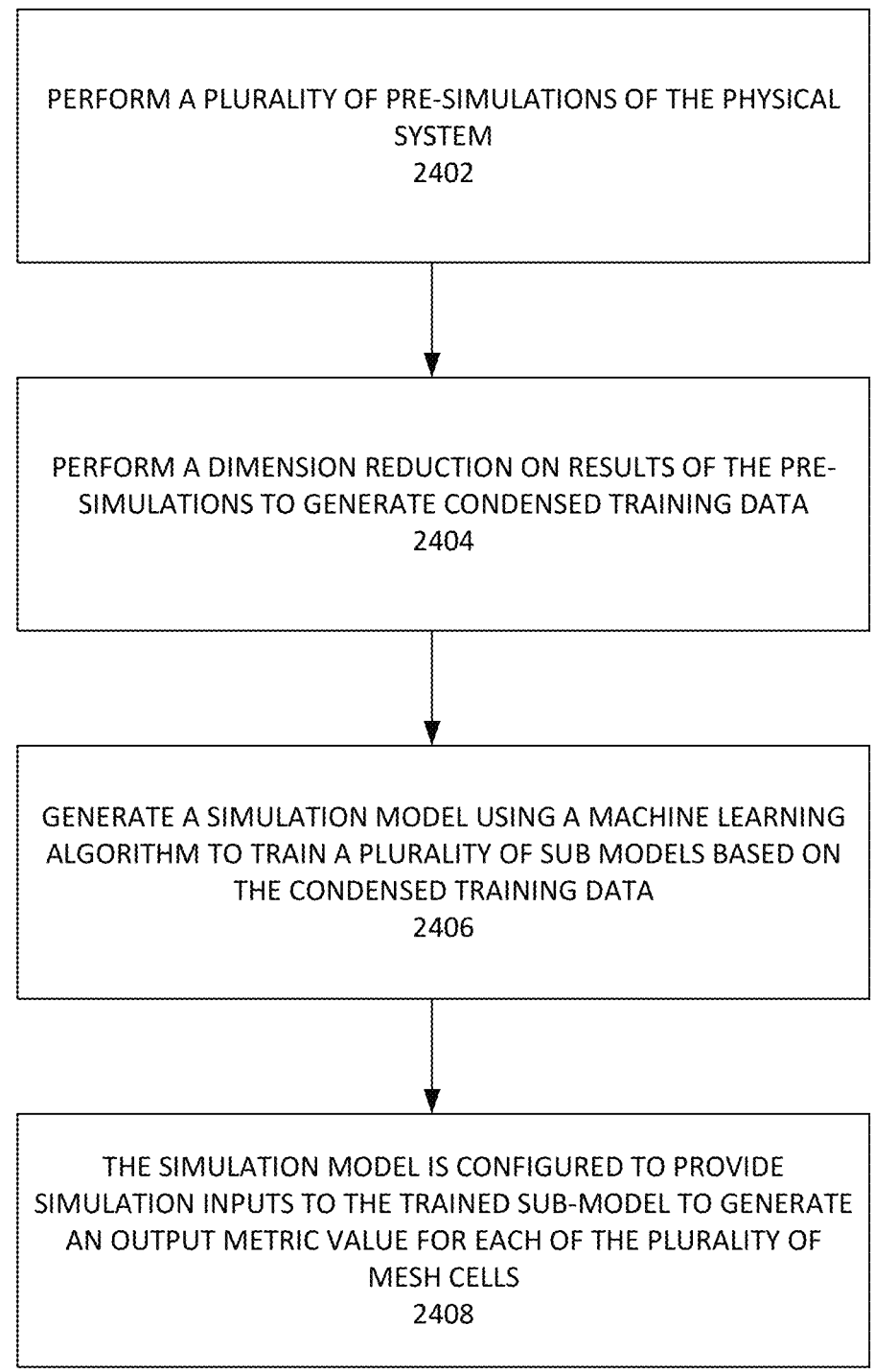

FIG. 24 is a flow diagram depicting a computer-implemented method for simulating operation of a physical system represented by a plurality of mesh cells.

FIG. 25 is a flow diagram depicting a method of simulating operation of a physical system represented by a plurality of mesh cells.

Figure 26:
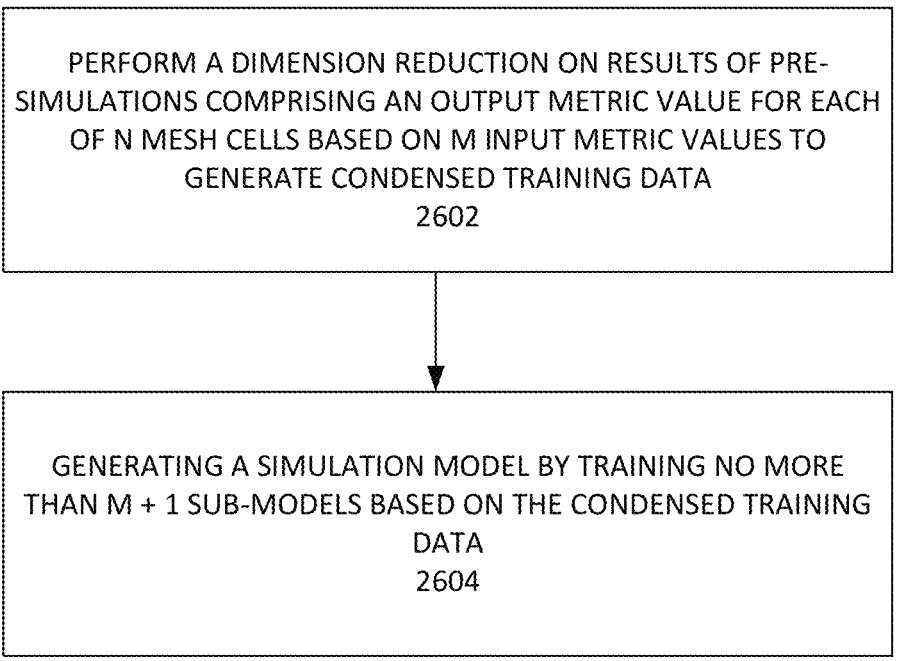

FIG. 26 is a flow diagram depicting a method of training a model for simulation of a physical system.

Figure 27C:
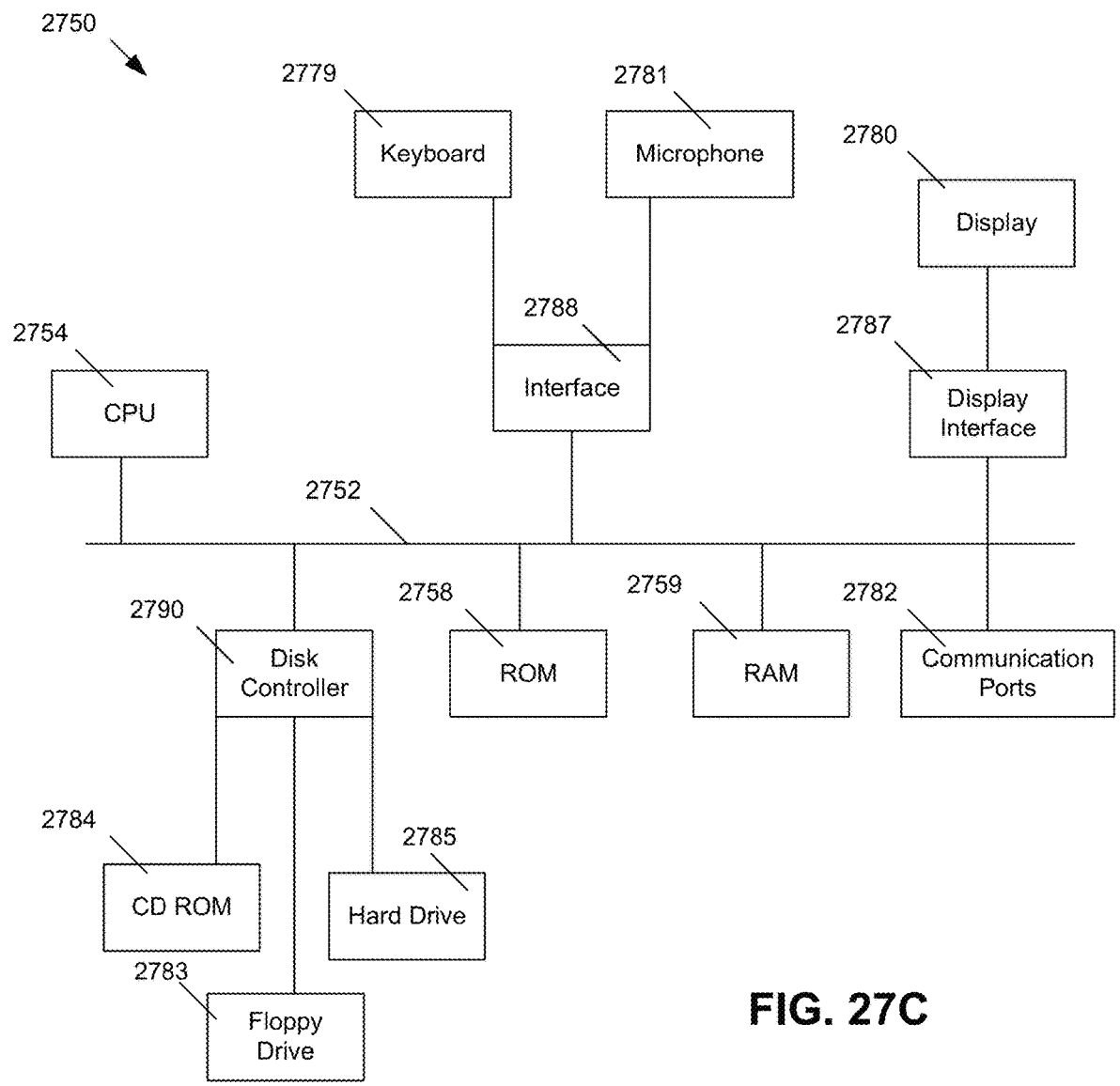

FIGS. 27A, 27B, and 27C depict example systems for implementing the approaches described herein for simulating operation of a physical system.

DETAILED DESCRIPTION

System and methods as described herein provide techniques for, in embodiments, improving speed performance of both simulation model operation and training. Regarding model operation, typical high-fidelity, complex simulation models (e.g., a CFD model) are configured to receive a definition of a physical system and inputs thereto and compute with high accuracy the effects of those inputs on the physical system as output metrics (e.g., a temperature value at each cell of a mesh representing the physical system). Embodiments herein utilize a reduced order model to speed calculation of those output metrics. A reduced order model (ROM) is a simplification of a high-fidelity model that captures the behavior of the source model to enable engineers to efficiently study a system's dominant effect using limited computational resources. A ROM is created using a mapping of inputs to a model (e.g., a high-fidelity CFD model, an electromagnetic model such as an Ansys HFSS model, a high-fidelity mechanical model) to its output metrics using a plurality of pre-simulations that model. By capturing the behavior of the model across a variety of inputs, the ROM is trained to mimic the more complex model's outputs without performing the time-consuming computations of a high-fidelity simulation modeling operation.

While a ROM, once produced, can provide fast (e.g., real-time) simulation of the effects of inputs on a system, generating the ROM can be computationally expensive. Oftentimes training a ROM requires many sets of training data acquired via pre-simulation using a corresponding high-fidelity model to produce a ROM that provides accurate results. For example, a ROM that receives input data and provides simulated output metrics for each cell of the mesh representing the system may require sets of training data on the order of the number of cells in the physical system mesh. That is, for a mesh having thousands of cells, thousands of sets of training data may be required in order to produce a ROM that provides sufficiently accurate results (e.g., a ROM that receives M inputs configured to provide N outputs, one (or more) corresponding to each mesh cell), and complex systems often include millions of cells. Such a process can be extremely time consuming, both in running the pre-simulations and training the ROM, so much so that accurate ROM generation may not be feasible in many circumstances.

Systems and methods as described herein can generate ROMs for high speed simulation of physical systems in a time and computationally efficient manner. The ROM is trained using input/output relationships of the physical system determined by simulation (e.g., high-fidelity simulation), but in embodiments, using fewer sets of training data and pre-simulations. In an embodiment, a ROM configured to receive M inputs and to provide N outputs (e.g., one output per cell of a physical system mesh), may comprise X sub-models, where X<N and in some instances X<<N, such as X=M+1, where those X sub-models can be trained to provide accurate results using a lesser number of training data sets (e.g., X+1 training sets). As a numerical example, a system having M=25 heat sources and N=9,000 mesh cells can be simulated using a ROM having M+1=26 sub-models using M+1=26 or fewer training data sets with a sufficient level of accuracy compared to high-fidelity simulation. Such a ROM can be efficiently produced and provide high speed, accurate simulation results once trained.

Figure 1:
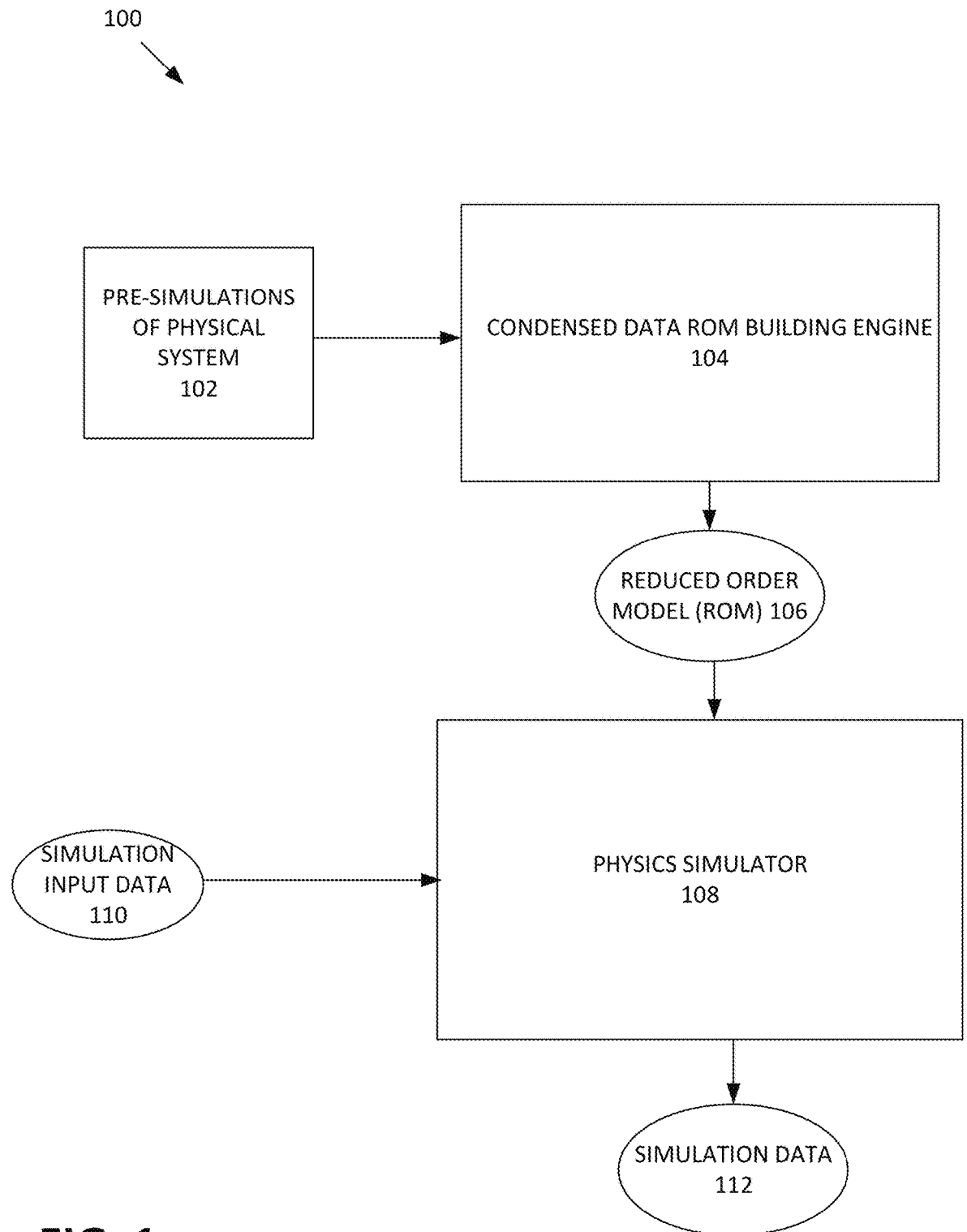
FIG. 1 is a block diagram depicting a computer-implemented system for simulating operation of a physical system represented by a plurality of mesh cells.

FIG. 1 is a block diagram depicting a computer-implemented system for simulating operation of a physical system represented by a plurality of mesh cells. For example, the system 100 of FIG. 1 may be configured to provide simulation of thermal behavior of integrated circuit level electronics subjected to a large number of heat sources (e.g., 10,000 or more heat sources originating from groups of one or more transistors). The system may be configured to provide output according to an engineering mesh (e.g., a large number of polygons or polyhedrals that connect in a series of lines and points to approximate geometry of an object(s) in the physical system), where one or more output values (e.g., a temperature value) are provided at each of the mesh cells at the conclusion of the simulation. At 102, a plurality of pre-simulations of the physical system are performed, such as through use of a high-fidelity simulation model (e.g., a subset of the many heat sources are activated in a run of a CFD simulation to determine an output temperature value at each mesh cell). Multiple simulations are performed at 102 across a number of trials (e.g., activation of different combinations of the many heat sources) to explore the behavior of the physical system across several trials. In examples described herein, the combinations of inputs selected across the trials are determined using Design of Experiments techniques.

The input/output relationships of the physical system discovered through the multiple pre-simulations at 102 are provided to a condensed data reduced order model (ROM) building engine 104 for generation of a ROM 106. As described further herein, where certain techniques may require large sets of training data (e.g., thousands or more trials on the order of the number of mesh cells of the physical system) to generate a ROM 106 for modeling complex physical systems, data compression (e.g., singular value decomposition) techniques described herein can facilitate generation of accurate ROMs using a relatively few sets of training data (e.g., X sets of training data where X≤M+1, where M is the number of inputs to the physical system). The compressed data ROM building engine 104 can provide faster ROM generation using fewer pre-simulations at 102, enabling feasible generation of ROMs to model complex physical systems that were previously impractical to model using a ROM.

Following generation, the ROM 106 is executed using a physical simulator 108 (e.g., software code that executes the model 106 by apply simulation input data 110 to the ROM 106 to generate output simulation data 112) to produce simulation data 112 for output to use in downstream analysis and design of the physical system. For example, the physics simulator 108 may receive input data 110 in the form of identification of activated heat sources (e.g., an array of 1's and 0's indicating heat sources as being on or off) that are provided to the ROM 106 to generate simulation data 112 in the form of one or more output metric values (e.g., a temperature value, a pressure value) at each of the mesh cells of the physical system being modeled.

Figure 2:
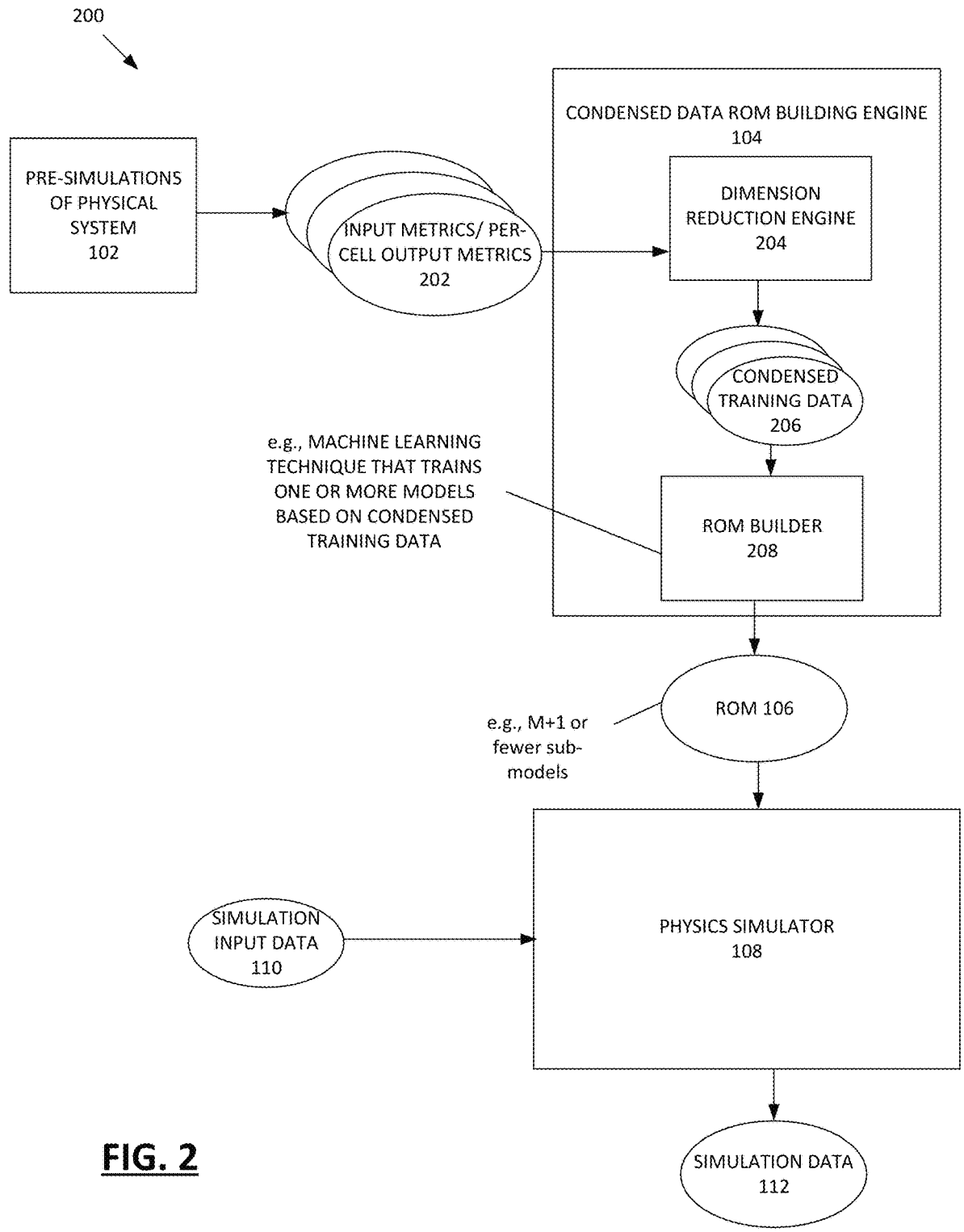
FIG. 2 is a diagram depicting example dimension reduction operations of a condensed data ROM building engine.

FIG. 2 is a diagram depicting example dimension reduction operations of a condensed data ROM building engine. A plurality of pre-simulations of the physical system are performed at 102, such as using a high-fidelity simulation model, to generate a plurality of sets of training data 202 for training a ROM 106 that is representative of the physical system. Specifically, the training data 202 comprises data regarding input/output relationships of the physical system discerned through pre-simulation runs. For example, one set of training data may indicate which of M input heat sources was on in a particular trial as well as N temperature values, one steady state temperature value associated with each of N mesh cells representing the physical system. The sets of training data 202 are provided to the condensed data ROM building engine 104 to generate the ROM 106. In the example of FIG. 2, the condensed data ROM building engine includes a dimension reduction engine 204 that operates on the training data 202 to generate condensed training data 206 that is used by a ROM builder to generate the ROM 106. That ROM 106 is then executed using a physics simulator 108 that applies simulation input data 110 to the ROM 108 to, in some embodiments quickly (e.g., in real time as a digital twin), provide output simulation data 112.

In an example, the system 200 performs a plurality of pre-simulations of the physical system at 102 to produce sets of training data 202, where a pre-simulation determines an output metric value for each mesh cell based on a plurality of input metric values. In the example, the physical system is represented by M input metric values (e.g., thousands of on-off values for groups of one or more transistors of an integrated circuit package) and N mesh cells (e.g., thousands or millions of mesh cells representing the integrated circuit package), where M<N. Where some systems and methods might require sets of training data 202 on the order of N (e.g., trials detailing many thousands or millions of pre-simulation runs), in the example of FIG. 2, the condensed data ROM building engine 104 is able to produce a ROM 106 that provides accurate results using M+1 or fewer sets of training data 202. That training data is used to generate the ROM 202, which comprises M+1 or fewer sub-models as described herein that contribute toward providing simulation data 112 output based on simulation input data 110.

The top table of FIG. 3 is a depiction of example input metrics that are provided to a high-fidelity simulation model to produce per-cell output metrics that together form sets of training data, and the bottom table depicts the per-cell output metrics across training trials. FIG. 3 depicts a portion of a top table of input metrics for simulation of a system having M=25 inputs (e.g., 25 heat sources) and N=2250 mesh cells representing the physical system. Each row of the table includes an input metric value for each of those 25 inputs (pow1-pow25). The top table of FIG. 3 provides input metrics for X=M+1=26 trials (trial001-trial026) to create 26 training data sets. During a trial, the 25 inputs of a row are provided to the simulation model to generate per-cell outputs indicating an output metric (e.g., temperature, pressure, flow) at each cell of physical system. Specifically, for trial001, the 25 input values of the top row (i.e., 0.481, 0.519, . . . ) are provided to a CFD model to produce per-cell output metrics. Thn for trial002, the 25 input values of the second row (i.e., 0.673, 0.750, . . . ) are provided to a CFD model to produce per-cell output metrics. That process is repeated, in this example, for X=M+1=26 trials to form an X-by-M matrix. In embodiments, the input values for the training trials are selected using a Design of Experiments algorithm (e.g., an optimal space filling algorithm), as described further herein.

The bottom table of FIG. 3 depicts a portion of a per-cell output metric set generated based on simulations initiated using the input metric values from the top table of FIG. 3. The bottom table of FIG. 3 provides one column for each pre-simulation trial, with rows corresponding to an output metric value (e.g. temperature) associated with each of the 2250 mesh cells that are representative of the physical system. For example, for trial001, when input metrics 0.481, 0.519, . . . are provided to a simulation model, the steady state temperature at cell 1 is determined to be 367.845, at cell 2 to be 367.271, at cell 3 to be 367.711, . . . . These simulation results form an N-by-X matrix.

The top and bottom tables of FIG. 3 together form the input metrics/per-cell output metrics 202 that form the training data sets shown in FIG. 2 that are provided to the condensed data ROM building engine 104. As indicated at 204, the training data is provided to a dimension reduction engine 204 for generation of condensed training data 206. In one example, as illustrated in FIG. 4, the dimension reduction engine 204 executes a singular value decomposition of the pre-simulation result data (FIG. 3, bottom table) to generate condensed training data. While certain examples herein are described using a singular value decomposition method to generate condensed training data 206, other data condensing/compression techniques may be used. For example, in certain embodiments principal component analysis (PCA) or a Karhunen-Loève compression or condensing procedure may be performed to generate condensed training data 206.

In one example, the singular value decomposition (SVD) is a factorization of a real or complex matrix that generalizes the eigendecomposition to an a×b matrix via an extension of the polar decomposition. For example, the singular value decomposition of an a×b complex matrix A is a factorization of the form $U\Sigma V^*$, where U is an a-by-a complex unitary matrix, $\Sigma$ is an a-by-b rectangular diagonal matrix with non-negative real numbers on the diagonal, and V is an b-by-b complex unitary matrix. When A is real, U and V can be guaranteed to be real orthogonal matrices. In such contexts, the SVD may be denoted $U\Sigma V^T$. The diagonal entries $\sigma_i = \Sigma_{ii}$ of $\Sigma$ are known as the singular values of A. The number of non-zero singular values is equal to the rank of A. The columns of U and the columns of V are called the left-singular vectors and right-singular vectors of A, respectively.

FIG. 4 is a diagram depicting condensed training data in the left hand table and data for training sub-models of a ROM in the right hand table. In the example of FIG. 4, the a singular value decomposition algorithm is applied to the pre-simulation per-cell output metrics of the bottom table of FIG. 3 to generate the condensed training data shown at 402. Specifically, the left hand table contains data values for each of the X=26 modes of the SVD operation for each of the X=26 trials, resulting in an X-by-X matrix. That is, for each SVD mode (e.g., SVD Mode 0), the SVD matrix 402 contains one data value for each of the X=26 trials (i.e., −17389.8 for trial001, −17410.9 for trial002, . . . ).

As illustrated in FIG. 2 at 206, 208, the condensed training data 206, comprising the SVD operation output 402 in the example of FIG. 4, is provided to a ROM builder 208 to generate ROM 106 using a machine learning technique, where generated ROM 106 comprises X=M+1 (i.e., 26 in the example of FIG. 4) or fewer sub-models. Those sub-models are represented in the ROM 106 and contribute toward providing simulation data 112 output based on simulation input data 110 as described further below. The machine learning technique utilized at 206 to generate the ROM 106 may take a variety of forms, some of which vary in complexity. For example, in some instances, linear or polynomial regression techniques may be utilized to individually train a series of sub-models (e.g., M+1 sub-models). In other instances, deep learning techniques may be utilized to generate 1 or more neural networks or other machine-learning trained models.

In the example of FIG. 4, X=26 sub-models are initially formed using a linear regression machine learning techniques. In certain further examples described herein, a goodness of fit evaluation of the sub-models is performed to determine whether the linear regression machine learning technique will provide sufficient accuracy. As described below, when sufficient accuracy is not provided via linear regression machine learning, other more advanced machine learning techniques (e.g., polynomial regression machine learning) may be utilized.

FIG. 4 at 404 illustrates the input data to a linear regression machine learning algorithm (e.g., a least squares algorithm) for generating a sub-model for SVD Mode 0. Specifically, the SVD Mode 0 value for a trial (i.e., −17389.8 for trial001, −17410.9 for trial002, . . . ) is provided as the dependent target value (y) while the M input values (i.e., pow1=0.481, pow2-0.519, . . . for trial 1) are provided as the independent values ($x_1$, $x_2$, . . . ). The linear regression machine learning technique, in the example of FIG. 4, is provided with the y, x values depicted at 404 for SVD Mode 0 for each of the X=26 trials. The machine learning technique generates a Mode 0 sub-model equation that predicts Mode 0 y values based on input independent values (pow1, pow2, . . . ) provided to the sub-model. That machine learning process is repeated for each of the SVD modes to generate X=M+1=26 sub-models of the ROM 106.

With reference back to FIG. 2, once trained, the sub-models of the ROM 106 are used to efficiently produce simulation data (e.g., a temperature, pressure, flow value per-cell) based in simulation input data to provide simulation predictions of the physical system. Specifically, in one example, the physics simulator 108 accesses the ROM 106, comprising X=26 sub-models, and simulation input data 110 that comprises data values for each of the M=25 inputs to the physical system. Those M=25 input values are provided to each of the X=26 sub-models to generate a Mode prediction for each of the 26 SVD modes (i.e., SVD Mode 0, SVD Mode 1, . . . , SVD Mode 25) to generate a 26-by-1 SVD coefficient estimate vector. That vector is multiplied by the N-by-M sized U matrix (N=2250, M=26) to generate an N-by-1 vector providing per-cell output metric simulation data 112 (e.g., N=2250 temperature values, one for each mesh cell).

As noted above, pre-simulation input metrics may be selected using a Design of Experiments Algorithm. In other examples, multiple machine learning algorithms may be utilized as informed by fit checks, in generating sub-models of the generated ROM 106. Further, a ROM 106 may be generated using less than M sub-models, when certain of those sub-models are deemed to make a material contribution to simulation results. FIG. 5 is a flow diagram depicting the application of certain of these features to an example ROM generation process. In a method for simulating operation of a physical system represented by a plurality of mesh cells, at 102, a plurality of pre-simulations of the physical system are performed. A pre-simulation determines an output metric value for each mesh cell based on a plurality of input metric values as depicted at 202. In the example of FIG. 5, the input metrics are selected using a design of experiments algorithm, as shown at 502, such as the algorithms illustrated in FIG. 6 for selecting values for two input metrics.

FIG. 6 illustrates example algorithms for Design of Experiments selection of pre-simulation inputs. A first example provided at 602 illustrates a Latin Hyper Cube Sampling algorithm, which is an advanced form of the Monte Carlo sampling method that avoids clustering samples. In this example, points are randomly generated in a grid across the design space, but no two points share input parameters of the same value. A second example provided at 604 illustrates an Optimal Space Filling algorithm. Such a space filling scheme distributes the design parameters equally throughout the design space. Such an algorithm may be useful when computation time available for pre-simulation is limited.

With reference back to FIG. 5, the Design of Experiments selected input metrics 502 are used for pre-simulation at 102 to generate training data sets at 202 that are provided to the condensed data ROM building engine 104. At 204, a dimension reduction is performed on results 202 of the pre-simulations to generate condensed training data. At 208, a simulation model is generated using a machine learning algorithm to train a plurality of sub-models for simulating output metric values for the plurality of mesh cells based on the condensed training data. As indicated at 504, ROM building at 208 may be an iterative process as instructed by a fit check. FIG. 7 depicts an example ROM building fit check operation.

FIG. 7 is a flow diagram depicting an example fit check of sub-models of a ROM generated using a machine learning algorithm. A first set of sub-models (e.g., one for each SVD mode) is generated, such as via a linear regression machine learning algorithm. The training data used to generate the sub-models (e.g., the data contained in the tables of FIG. 3) is then used to perform an $R^2$ evaluation of the sub-models at 702, such as by providing the input values from the top table of FIG. 3 to determine how close the ROM's per-cell predictions are to the high-fidelity simulation results shown in the bottom table of FIG. 3. If that $R^2$ evaluation indicates a sufficient level of accuracy (e.g., $R^2$>a threshold value such as 0.95), then the current set of sub-models is considered sufficiently accurate for use at 706. If the $R^2$ evaluation indicates less than the threshold level of accuracy, then a new set of sub-models is trained, such as using a higher-order machine learning technique (e.g., a second order polynomial regression) at 708. In the example of FIG. 7, when linear regression is deemed insufficiently accurate at 704, up to a limit (e.g., 4) orders of polynomial regression machine learning techniques are executed to generate sets of sub-models (e.g., a $2^{nd}$ order set of sub-models, a $3^{rd}$ order set of sub-models, and a $4^{th}$ order set of sub-models). An $R^2$ evaluation of each of those sets of sub-models is performed and whichever of the linear or polynomial regression based sets of sub-models exhibiting the highest level of accuracy is identified for use in prediction of unseen scenarios at 706.

With reference back to FIG. 5, subsequent to generation of a base ROM after fit checks, the ROM may be simplified as indicated at 506 prior to output at 106 for use. It has been observed that in some instances, certain of the X sub-models generated by the ROM builder 208 dominate in providing per-cell output metrics. For example, the first 14 of 26 sub-models may contribute 99%+ of the information used to provide per-cell temperature metrics of the ROM. In such an instance, it may be desirable to disable certain of the sub-models of the ROM 106 so as to increase speed of predictions. FIG. 8 is a diagram depicting contribution-based simplification of a ROM. There an initial ROM 106 is generated using techniques described herein. Post-sub-model generation, a contribution evaluation may be performed on the sub-models to determine an amount each contributes to the per-cell output metric of interest. As depicted at 802 in evaluating a temperature-predicting ROM, a few of the singular values (e.g., 4) capture most of the energy that is predictive of the per-cell output temperatures. In such an instance, the number of sub-models used by the physics simulator 108 to provide per-cell output metrics 112 may be limited (e.g., only 4 of 26 sub-models). This reduces the computation required of the physics simulator 108 and may speed ROM simulation (e.g., to a speed fast enough to provide real-time execution).

With reference back to FIG. 5, following generation of the ROM 106, simulation inputs 110 are provided to the ROM simulation model 106 at 108, where the simulation model provides the simulation inputs 110 to the trained sub-models to generate an output metric for each of the plurality of mesh cells at 112.

As noted above, systems and methods described herein can enable generation of a ROM using limited iterations of pre-simulation to generate training data sets. FIG. 9 is a table indicating training speed and accuracy of certain ROMs using condensed training data, such as described herein. The table indicates the type of physics being simulated, the number of input parameters and the number of training data sets (snapshots) generated using pre-simulation. ROM training time is indicated, with "SVDML" indicating training using techniques described herein, and "Conventional Training" indicating training time using a differing technique. Speed differentials are noted along with comparison in accuracy. It is noted that the SVDML training is faster than the Conventional Training in each instance, and that the SVDML provides at least equivalent accuracy in each of the identified instances. It is further noted that in one instance, Case 4, having 576 input parameters, training using the Conventional Training technique was deemed infeasible because of an inordinate time period to train the desired ROM. Certain of the examples identified in the table of FIG. 9 are illustrated in further detail in the following figures.

FIG. 10 depicts a conduction physics example (Case 1 of FIG. 9) having 25 heat sources between 0 and 1 W. The silicon substrate having 25 heat sources made up of one or more transistors each is illustrated at 1002, with one heat source being associated with each of the 25 solid line squares. ROMs were trained using 26 sets of training data generated using a CFD simulation model that provides temperature outputs for each of 2250 mesh cells. A comparison of the CFD model's output for an arbitrary future set of 25 input values (blue at 1004) is overlaid on the ROM generated using condensed training data (red at 1004), where minimal deviation is ascertainable. A graphical comparison of the CFD output at the 2250 mesh cells is shown in the left two cells at 1006. The third box illustrates the 2250 mesh cell temperatures predicted using the SVDML ROM, and the right hand box illustrates predictions from the model trained using Conventional Training. It is noted that the model trained via Conventional Training provides results of little value due to inadequate training provided by the 26 training data sets. As noted in FIG. 9 for Case 1, the condensed training data ROM was trained 39 times faster than the model trained via Conventional Training and provided significantly improved accuracy.

FIG. 11 depicts a conduction physics example (Case 2 of FIG. 9) having 25 heat sources between 0 and 1 W. The silicon substrate having 25 heat sources made up of one or more transistors each is illustrated at 1102, with one heat source being associated with each of the 25 solid line squares. ROMs were trained using 200 sets of training data generated using a CFD simulation model that provides temperature outputs for each of 2250 mesh cells. A comparison of the CFD model's output for an arbitrary future set of 25 input values (blue at 1104) is overlaid on the ROM generated using condensed training data (red at 1104), where minimal deviation is ascertainable. A graphical comparison of the CFD output at the 2250 mesh cells is shown in the left two cells at 1106. The third box illustrates the 2250 mesh cell temperatures predicted using the SVDML ROM, and the right hand box illustrates predictions from the model trained via Conventional Training. It is noted that the model trained using Conventional Training provides results of little value due to inadequate training provided by the 26 training data sets. As noted in FIG. 9 for Case 2, the condensed training data ROM was trained 415 times faster than the model trained using Conventional Training and provided comparable accuracy.

FIG. 12 depicts a conduction physics example (Case 3 of FIG. 9) having 100 heat sources between 0 and 1 W. The silicon substrate having 100 heat sources made up of one or more transistors each is illustrated at 1202, with one heat source being associated with each of the 100 solid line squares. ROMs were trained using 101 sets of training data generated using a CFD simulation model that provides temperature outputs for each of 9000 mesh cells. A comparison of the CFD model's output for an arbitrary future set of 100 input values (blue at 1204) is overlaid on the ROM generated using condensed training data (red at 1204), where minimal deviation is ascertainable. A graphical comparison of the CFD output at the 9000 mesh cells is shown in the left two cells at 1206. The third box illustrates the 9000 mesh cell temperatures predicted using the SVDML ROM, and the right hand box illustrates predictions from the model trained using Conventional Training. As noted in FIG. 9 for Case 3, the condensed training data ROM was trained 1000 times faster than the model trained using Conventional Training and provided comparable accuracy.

FIG. 13 depicts a conduction physics example (Case 4 of FIG. 9) having 576 heat sources between 0 and 1 W. The silicon substrate having 576 heat sources made up of one or more transistors each is illustrated at 1302, with one heat source being associated with each of the 576 solid line squares. ROMs were trained using 577 sets of training data generated using a CFD simulation model that provides temperature outputs for each of 103,680 mesh cells. A comparison of the CFD model's output for an arbitrary future set of 576 input values (blue at 1304) is overlaid on the ROM generated using condensed training data (red at 1304), where minimal deviation is ascertainable. A graphical comparison of the CFD output at the 103,680 mesh cells is shown in the left two cells at 1306. The third box illustrates the 103,680 mesh cell temperatures predicted using the SVDML ROM. A ROM for the 103,680 mesh cells was infeasible to create based on requiring an inordinate amount of time.

Other more complex systems may be similarly modeled using condensed training data techniques as described herein. For example, FIGS. 14-16 illustrate a conjugate heat transfer simulation utilizing natural convection. The physical system is a cellular phone that includes a printed circuit board and integrated circuit components comprising 18 heat sources depicted at 1402. ROMs were trained using 50 sets of training data that considered radiation, gravity and laminar flow. The physical system was modeled using 181,236 mesh cells. A comparison is depicted in FIG. 14 of CFD results at 1404 and ROM results 1406 from a ROM produced using condensed training data techniques. Substantial similarity of results is observed. Similar comparability of predictions is observed in FIG. 15 between CFD and the condensed training data ROM. FIG. 16 further indicates accurate results in a low power case at 1602 and a high power case at 1604. As noted in FIG. 9 for Case 5, the condensed training data ROM was trained 53 times faster than the model trained using Conventional Training and provided comparable accuracy.

FIGS. 17-18 depict a conjugate heat transfer simulation using forced convection using two fans. Two heat sources are defined as input parameters. ROMs were trained using 25 sets of training data for a physical system represented by 183,757 mesh cells. FIG. 17 illustrates the physical system being modeled and air velocity simulation results across the CFD, SVDML ROM, and Conventional Training model simulations. FIG. 18 depicts temperature comparisons across the simulation techniques at the top, while the bottom portion provides overlays between CFD simulation of various parameters and the ROM simulation output from the SVDML ROM generated using condensed training data techniques. As noted in FIG. 9 for Case 6, the condensed training data ROM was trained 3 times faster than the model trained using Conventional Training and provided comparable accuracy.

FIGS. 19-20 depicts a joule heating, conduction only simulation. The simulation evaluates a PCB system with traces where one trace is modeled explicitly. The system includes 2 current sources between 0 and 10 amps. ROMs were trained using 40 sets of training data to predict parameters of a mesh having 188,228 cells. FIG. 19 illustrates the physical system being modeled at the top. The two graphs provide an overlay of CFD simulation predictions (blue) and SVDML ROM predictions (red) for temperature, exhibiting minimal mismatch. FIG. 20 provides graphical illustrations of the predictions, where CFD, SVDML, and Conventional Training model predictions are similar. As noted in FIG. 9 for Case 7, the condensed training data ROM was trained 3 times faster than the model trained using Conventional Training and provided comparable accuracy.

FIGS. 21-22 depict another joule heating, conduction only, simulation. The simulation evaluates a PCB system with traces where one trace is modeled explicitly. The system includes 10 current sources between 0 and 10 amps. ROMs were trained using 66 sets of training data to predict parameters of a mesh having 206,812 cells. FIG. 21 illustrates the physical system being modeled at the top. The left two graphs provide an overlay of CFD simulation predictions (blue) and SVDML ROM predictions (red) for temperature, exhibiting minimal mismatch. In contrast, the right graph comparing predictions using the CFD model (blue) and the model trained using Conventional Training (red) exhibit significant mismatches in predictions. FIG. 22 provides graphical illustrations of those predictions, where CFD and SVDML predictions are substantially similar. As noted in FIG. 9 for Case 8, the condensed training data ROM was trained 10 times faster than the model trained using Conventional Training and provided significantly better accuracy.

FIG. 23 depicts a thermo-mechanical finite element analysis. The Case 9 example simulates a phone model with a printed circuit board and integrated circuit components. The models were trained using 19 training data sets for 18 configurable sources of input physics data. The physical system was modeled using 119,802 nodes. The left two graphs provide an overlay of finite element analysis simulation predictions (blue) and SVDML ROM predictions (red) for deformation and equivalent Von Mises stress values, exhibiting minimal mismatch. The right graph comparing predictions using the finite element analysis (blue) and the model trained using Conventional Training (red) exhibits similar accuracy. FIG. 23 further depicts contour plots for stress and deformation generated by each of the high-fidelity simulation, SVDML ROM, and Conventionally Trained ROM, each of which generates substantially identical results. As noted in FIG. 9 for Case 9, the condensed training data ROM was trained 7 times faster than the model trained using Conventional Training and provided similar accuracy.

FIG. 24 is a flow diagram depicting a computer-implemented method for simulating operation of a physical system represented by a plurality of mesh cells. At 2402, a plurality of pre-simulations of the physical system are performed, where a pre-simulation determines an output metric value for each mesh cell based on a plurality of input metric values. At 2404, a dimension reduction is performed on results of the pre-simulations to generate condensed training data, and at 2406, a simulation model is generated using a machine learning algorithm to train a plurality of sub-models for simulating output metric values for the plurality of mesh cells based on the condensed training data. The simulation model is configured to provide simulation inputs to the trained sub-models to generate an output metric value for each of the plurality of mesh cells, as indicated at 2408.

FIG. 25 is a flow diagram depicting a method of simulating operation of a physical system represented by a plurality of mesh cells. At 2502, a simulation model is invoked that accepts M input metric values and provides an output metric value for each of N mesh cells, where the simulation model includes a plurality of X trained sub-models, where X is less than N, to generate an output metric value for each of the plurality of mesh cells by: invoking each of the X sub-models with the M input metric values to generate a [1-by-X] matrix at 2504 and multiplying the [1-by-X] matrix by an [X-by-N] matrix to generate the output metric value for each of the N mesh cells as depicted at 2506.

FIG. 26 is a flow diagram depicting a method of training a model for simulation of a physical system. At 2602, a dimension reduction is performed on results of pre-simulations of the physical system to generate condensed training data, wherein the pre-simulations determine an output metric value for each of N mesh cells based on M input metric values. At 2604, a simulation model is generated using a machine learning algorithm to train no more than M+1 sub-models for simulating output metric values for the plurality of mesh cells based on the condensed training data, where the simulation model is configured to receive M simulation inputs, to provide the M simulation inputs to the no more than M+1 trained sub-models, and to generate an output metric value for each of the N of mesh cells.

FIGS. 27A, 27B, and 27C depict example systems for implementing the approaches described herein for simulating operation of a physical system. For example, FIG. 27A depicts an exemplary system 2700 that includes a standalone computer architecture where a processing system 2702 (e.g., one or more computer processors located in a given computer or in multiple computers that may be separate and distinct from one another) includes a computer-implemented reduced order model generation module 2704 being executed on the processing system 2702. The processing system 2702 has access to a computer-readable memory 2707 in addition to one or more data stores 2708. The one or more data stores 2708 may include pre-simulated training data 2710 as well as a trained ROM 2712. The processing system 2702 may be a distributed parallel computing environment, which may be used to handle very large-scale data sets.

FIG. 27B depicts a system 2720 that includes a client-server architecture. One or more user PCs 2722 access one or more servers 2724 a computer-implemented reduced order model generation module 2737 on a processing system 2727 via one or more networks 2728. The one or more servers 2724 may access a computer-readable memory 2730 as well as one or more data stores 2732. The one or more data stores 2732 may include pre-simulated training data 2734 as well as a trained ROM 2738.

FIG. 27C shows a block diagram of exemplary hardware for a standalone computer architecture 2750, such as the architecture depicted in FIG. 27A that may be used to include and/or implement the program instructions of system embodiments of the present disclosure. A bus 2752 may serve as the information highway interconnecting the other illustrated components of the hardware. A processing system 2754 labeled CPU (central processing unit) (e.g., one or more computer processors at a given computer or at multiple computers), may perform calculations and logic operations required to execute a program. A non-transitory processor-readable storage medium, such as read only memory (ROM) 2758 and random access memory (RAM) 2759, may be in communication with the processing system 2754 and may include one or more programming instructions for providing reduced order model generation. Optionally, program instructions may be stored on a non-transitory computer-readable storage medium such as a magnetic disk, optical disk, recordable memory device, flash memory, or other physical storage medium.

In FIGS. 27A, 27B, and 27C, computer readable memories 2707, 2730, 2758, 2759 or data stores 2708, 2732, 2783, 2784, 2788 may include one or more data structures for storing and associating various data used in the example systems. For example, a data structure stored in any of the aforementioned locations may be used to store data from XML files, initial parameters, and/or data for other variables described herein. A disk controller 2790 interfaces one or more optional disk drives to the system bus 2752. These disk drives may be external or internal floppy disk drives such as 2783, external or internal CD-ROM, CD-R, CD-RW or DVD drives such as 2784, or external or internal hard drives 2785. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 2790, the ROM 2758 and/or the RAM 2759. The processor 2754 may access one or more components as required.

A display interface 2787 may permit information from the bus 2752 to be displayed on a display 2780 in audio, graphic, or alphanumeric format. Communication with external devices may optionally occur using various communication ports 2782.

In addition to these computer-type components, the hardware may also include data input devices, such as a keyboard 2779, or other input device 2781, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method comprising:
   receiving a mesh model representing a physical system, the model comprising a plurality of mesh cells;
   performing a plurality of simulations of the physical system based on the mesh model to determine output metric values for mesh cells of the mesh model based on a respective set of input parameter values for each simulation;
   performing a dimension reduction on results of the simulations to generate condensed training data;
   training, using a machine learning algorithm and based on the condensed training data, one or more sub-models for estimating output metric values for the plurality of mesh cells based on a corresponding set of input parameter values; and
   generating a reduced order engineering simulation model comprising the trained one or more sub-models, the reduced order engineering simulation model configured to provide simulation inputs to the trained sub-models in response to a provided set of input parameter values for generating an output metric value for each of the plurality of mesh cells to simulate behaviors of the physical system.

2. The method of claim 1, wherein a number of sub-models trained is less than a number of mesh cells.

3. The method of claim 1, wherein the physical system is represented by M input metric values and N mesh cells, and wherein the reduced order engineering simulation model comprises X sub-models where X<N.

4. The method of claim 3 wherein X=M+1.

5. The method of claim 4, wherein X pre-simulations are performed to generate said results of the pre-simulations.

6. The method of claim 1, wherein the dimension reduction is performed using a singular value decomposition algorithm, wherein each of the sub-models is associated with a mode of a singular value decomposition of the results of the simulations.

7. The method of claim 1, wherein the machine learning algorithm is a linear regression algorithm.

8. The method of claim 7, further comprising:
performing a fit check of the plurality of sub-models based on the condensed training data to determine whether a fit of the sub-models meets a fit criteria;
when the fit criteria is not met, retraining the plurality of sub-models using a polynomial regression model.

9. The method of claim 1, further comprising:
evaluating the sub-models to determine a subset of the sub-models that has more than a threshold influence on output metric values;
wherein one or more sub-models are disabled based on said evaluation.

10. The method of claim 1, wherein the plurality of input metric values for each of the simulations are selected using a design of experiments algorithm.

11. The method of claim 10, wherein the design of experiments algorithm is a Latin Hyper Cube Sampling algorithm or an Optimal Space Filling algorithm.

12. The method of claim 1, wherein one or more of the simulations outputs a temperature, pressure, stress, strain, electromagnetic, or flow value associated with the plurality of mesh cells.

13. The method of claim 1, wherein the mesh model comprises a high-fidelity engineering simulation model including a computational fluid dynamics engine, an electromagnetic simulation engine, or a mechanical simulation engine.

14. The method of claim 1, wherein the simulation identifies predicted behavior of an integrated circuit system when subjected to heat radiated from a plurality of heat sources.

15. A method for simulating operation of a physical system represented by a plurality of mesh cells, comprising:
invoking an engineering simulation model that is configured to accept M input metric values and provide an output metric value for each of N mesh cells, wherein the engineering simulation model includes a plurality of X trained sub-models, where X is less than N, the sub-models each comprising one or more machine learning models;
receiving the M input metric values and generating the output metric value for each of the plurality of mesh cells by:
invoking each of the X trained sub-models with the M input metric values to generate a [1-by-X] matrix;
multiplying the [1-by-X] matrix by an [X-by-N] matrix to generate the output metric value for each of the N mesh cells;
providing the generated output metric values for the plurality of mesh cells to a consuming application or process for downstream analysis and design of the physical system, the consuming application or process being executed by one or more computing devices; and
simulating, by the consuming application or process, operation of the physical system using the provided generated output metric values for the plurality of mesh cells.

16. The method of claim 15, wherein X≤M+1.

17. The method of claim 15, wherein the [X-by-N] matrix is generated based on a singular value decomposition operation on an observation matrix formed based on pre-simulations of the physical system performed before training of the engineering simulation model.

18. A computer-implemented method of training and using an engineering simulation model for simulation of a physical system, comprising:
performing a dimension reduction on results of pre-simulations of the physical system using a high-fidelity engineering simulation model to generate condensed training data, wherein the pre-simulations determine an output metric value for each of N mesh cells based on M input metric values;
generating a reduced order engineering simulation model using a machine learning algorithm to train no more than M+1 sub-models for simulating output metric values for the plurality of mesh cells based on the condensed training data; and
simulating, using one or more computing devices, behavior of the physical system using the reduced order engineering simulation model;
wherein the simulation model is configured to receive M simulation inputs, to provide the M simulation inputs to the no more than M+1 trained sub-models, and to generate the output metric value for each of the N of mesh cells;
wherein the high-fidelity engineering simulation model consumes more computational resources than the reduced order engineering simulation model.

19. The method of claim 18, determining a number of sub-models to train based on the condensed training data.

20. The method of claim 18, further comprising:
performing a fit check of the sub-models based on the condensed training data to determine whether a fit of the sub-models meets a fit criteria;
when the fit criteria is not met, retraining the sub-models using a polynomial regression model.

* * * * *